United States Patent [19]

McLaughlin et al.

[11] Patent Number: 5,604,682
[45] Date of Patent: Feb. 18, 1997

[54] INFORMATION SERVICE CONTROL POINT WHICH RETRIEVES INFORMATION AS BLOCKS OF DATA AND OUTPUTS THE RETRIEVED DATA VIA A COMMUNICATIONS LINK

[75] Inventors: Robert McLaughlin, Arlington; M. James Bullen, Reston, both of Va.

[73] Assignee: Image Telecommunications Corp., Westport, Conn.

[21] Appl. No.: 634,614

[22] Filed: Apr. 19, 1996

Related U.S. Application Data

[62] Division of Ser. No. 136,185, Oct. 15, 1993.
[51] Int. Cl.$^6$ ..................................................... H04N 7/14
[52] U.S. Cl. ........................... 364/514 A; 348/7; 348/6; 455/5.1; 455/4.2; 370/428; 359/118
[58] Field of Search .................................. 348/7, 12, 13; 345/4.2, 5.1; 370/85.5; 379/89, 90, 105; 455/5.1, 6.3, 6.1; 359/118; 364/514

[56] References Cited

U.S. PATENT DOCUMENTS

| | | |
|---|---|---|
| 3,713,096 | 1/1973 | Comfort et al. . |
| 3,735,362 | 5/1973 | Ashany et al. . |
| 3,748,647 | 7/1973 | Ashany et al. . |
| 3,812,476 | 5/1974 | Cragon . |
| 4,064,556 | 12/1977 | Edelberg et al. . |
| 4,065,756 | 12/1977 | Panigrahi . |
| 4,193,121 | 3/1980 | Fedida et al. . |
| 4,302,632 | 11/1981 | Vicari et al. .............................. 179/27 |
| 4,506,387 | 3/1985 | Walter . |
| 4,538,174 | 8/1985 | Gargini et al. . |
| 4,672,602 | 6/1987 | Hargrave et al. ......................... 370/58 |
| 4,763,317 | 8/1988 | Lehman et al. . |
| 4,790,418 | 12/1988 | Fox et al. . |
| 4,995,078 | 2/1991 | Monslow et al. . |
| 5,014,125 | 5/1991 | Pocock et al. . |
| 5,027,400 | 6/1991 | Baji et al. . |

(List continued on next page.)

OTHER PUBLICATIONS

Chang et al., An Open–Systems Approach, IEEE Communications Magazine, May 1994, pp. 68–80.

Deloddere et al., Interactive Video On Demand, IEEE Communications Magazine, May 1994, pp. 82–88.

J. Richard Jones, Baseband and Passband Transport Systems for Interactive Video Services, IEEE Communications, May 1994, pp. 90–101.

(List continued on next page.)

*Primary Examiner*—Edward R. Cosimano
*Assistant Examiner*—Shah Kamini
*Attorney, Agent, or Firm*—Sughrue, Mion, Zinn, Macpeak & Seas

[57] ABSTRACT

Various methods and associated apparatuses are provided for communicating data from a central station to a remote station over some form of communications path. The data, which together form at least one title, are stored on at least one storage device. The data forming that title are then retrieved as data blocks from storage. Each data block is a sequential segment of the data. Finally, the retrieved data blocks are transmitted from the central station to the remote station. According to preferred embodiments, two types of storage devices are provided. The first type, preferably formed as an array of playback units, allows the data to be stored as data blocks and distributed accordingly over a plurality of storage devices. The second type, preferably formed as ring structures composed of solid state elements, provides a plurality of access points coupled to the storage medium, each of which is able to retrieve the data independently of other access points. For further versatility in the system, the data blocks can also be transmitted independently of one another from the central station. Preferably, the step of retrieving the data is performed in response to receiving a request for a given title. The various systems disclosed allow a wide assortment of titles (e.g., movies, educational-, entertainment-, consumer-, and business-related information, and any information that can be converted into a stream of data) to be transmitted to a wide audience with great flexibility and minimal contention between users for the titles offered.

14 Claims, 12 Drawing Sheets

U.S. PATENT DOCUMENTS

| | | |
|---|---|---|
| 5,060,068 | 10/1991 | Lindstrom . |
| 5,084,839 | 1/1992 | Young . |
| 5,119,481 | 6/1992 | Frank et al. . |
| 5,130,792 | 7/1992 | Tindell et al. . |
| 5,132,992 | 7/1992 | Yurt et al. . |
| 5,133,079 | 7/1992 | Ballantyne et al. . |
| 5,166,926 | 11/1992 | Cisneros et al. . |
| 5,189,673 | 2/1993 | Burton et al. . |
| 5,191,410 | 3/1993 | McCalley et al. . |
| 5,197,064 | 3/1993 | Chao . |
| 5,247,347 | 9/1993 | Litteral et al. . |
| 5,253,341 | 10/1993 | Rozmanith et al. . |
| 5,396,339 | 3/1995 | Stern et al. . |
| 5,414,455 | 5/1995 | Hooper et al. . |
| 5,440,336 | 8/1995 | Buhro et al. . |
| 5,442,390 | 8/1995 | Hooper et al. . |
| 5,451,982 | 9/1995 | Stern et al. . |

OTHER PUBLICATIONS

Chen et al., Applicability of ADSL to Support Video Dial Tone in the Cooper Loop, IEEE Communications Magazine, May 1994. pp. 102–109.

Faulkner et al., Multichannel Digital TV Distribution and Local Video Networking, Optical Communication (1988). pp. 549–552.

Sincoskie, System Architecture fo a Large Scale Video on Demand Service, Computer Networks and ISDN Systems 22 (1991). pp. 155–162.

Lizzio, Real–time RAID Storage: The Enabling Technology for Video–on–demand, Telephony V. 226 No. 21, May 1994. pp. 24–32.

Rangan et al., Designing an On–Demand Multimedia Service, IEEE Communications Magazine, Jul. 1992. pp. 56–64.

Drapeau, RAID–II: A High–Bandwidth Network File Server, IEEE (1994). pp. 234–244.

Merchant et al., Design and Modeling of Clustered RAID, IEEE (1992). pp. 140–149.

Anderson, Strength (and Safety) in Numbers, BYTE, Dec. 1990. pp. 337–339.

Kumar et al., Technologies for Distribution of Interactive Multimedia to Residiential Subscribers, IEEE (1994). pp. 151–160.

Chang et al; Scalable Video Data Placement on Parallel Disk Arrays, SPIE vol. 2185, Aug. 94 (?). pp. 208–221.

Chang et al., Variable Bit Rate MPEG Video Storage on Parallel Disk Arrays, IEEE, Oct. 1994 (?). pp. 127–137.

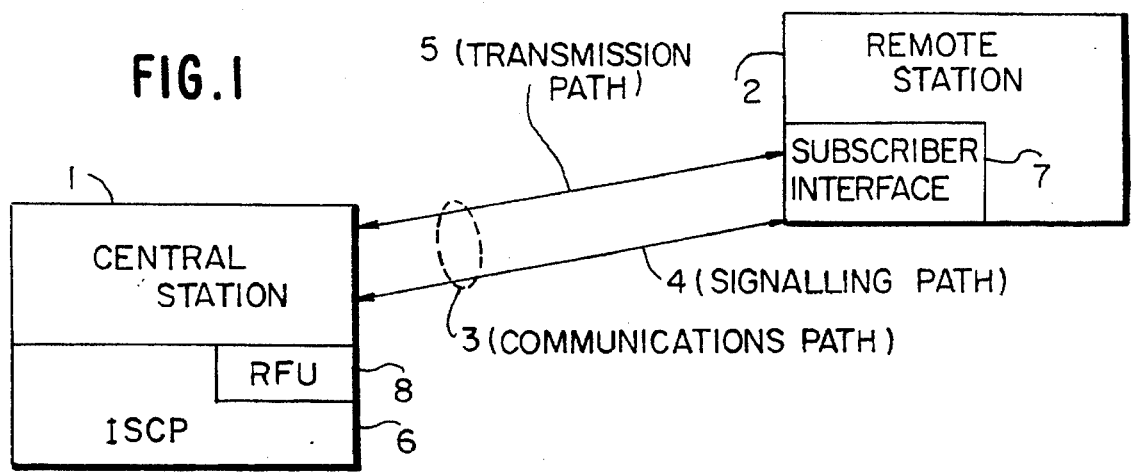
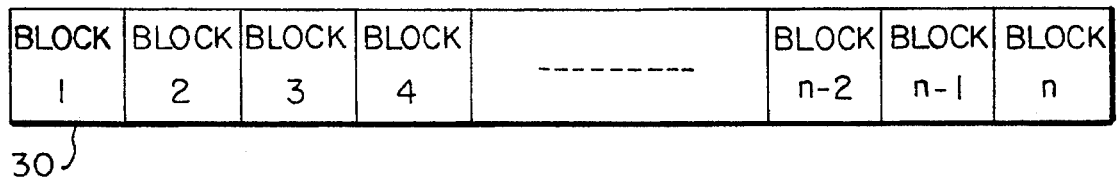
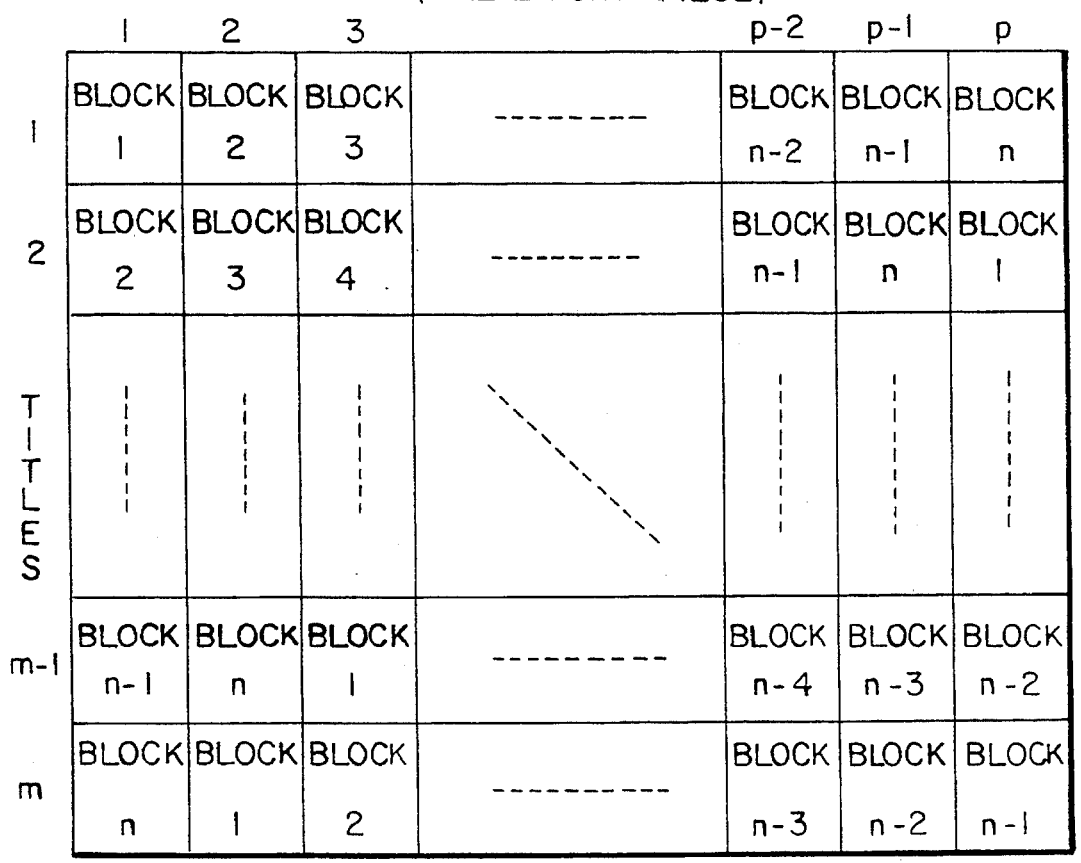

RFU
(FUNCTIONAL BLOCK DIAGRAM)

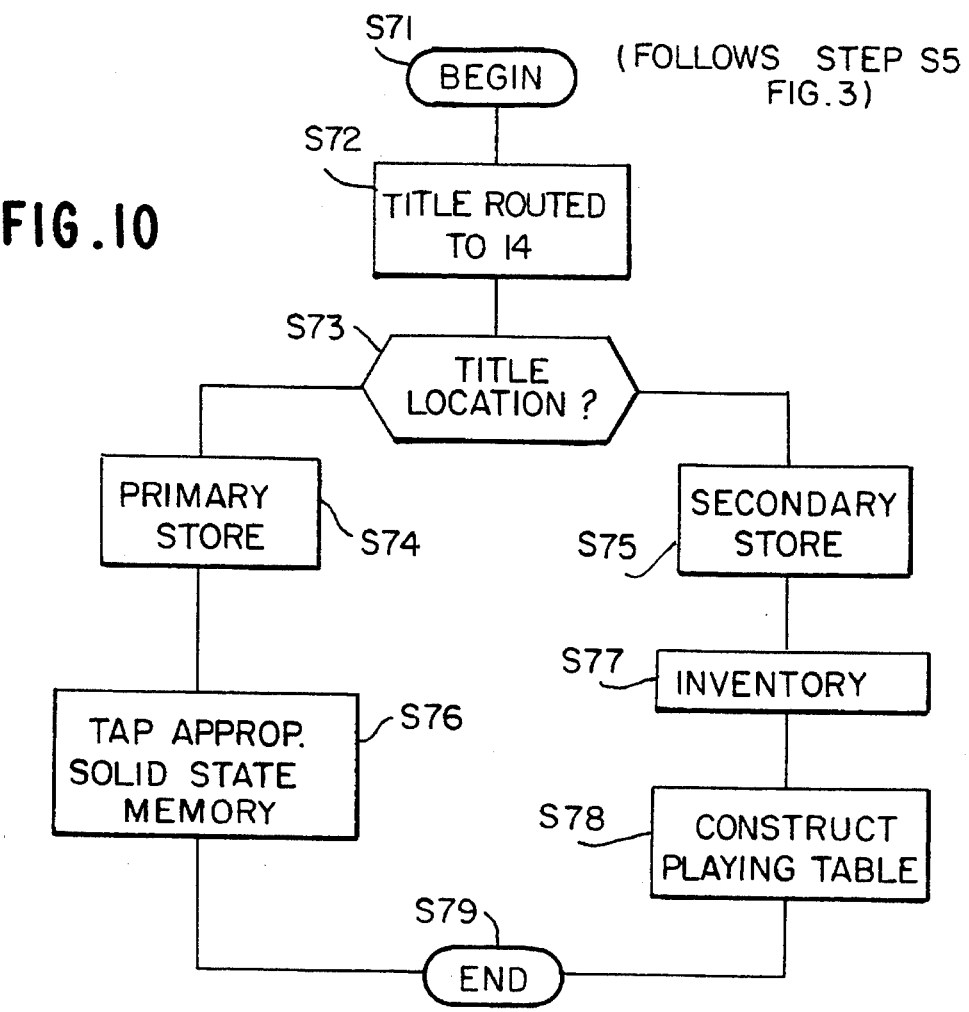
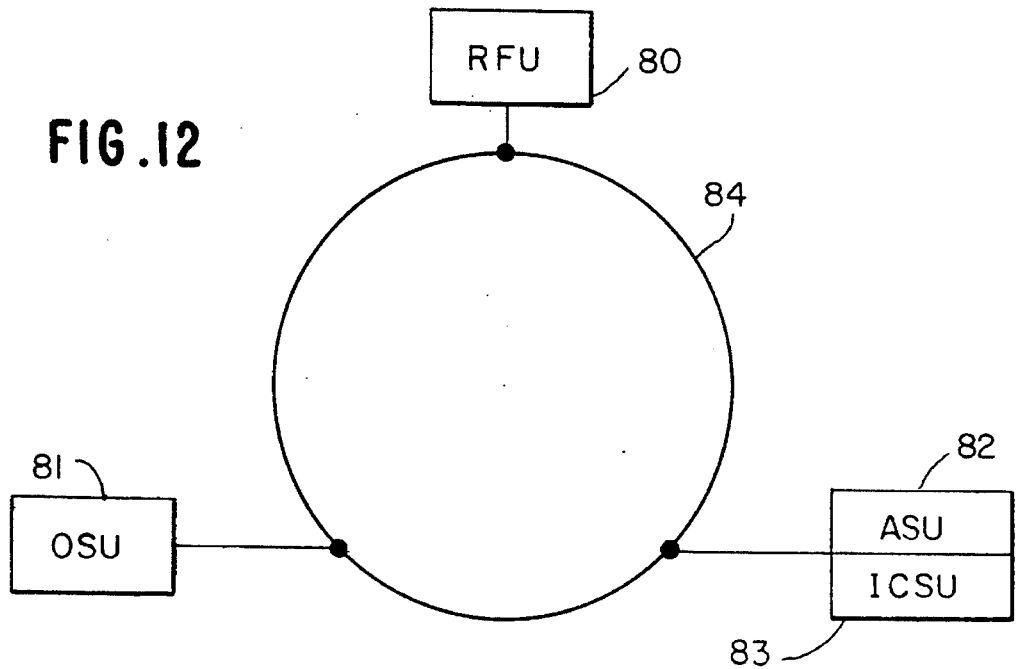

INFORMATION SERVICE CONTROL POINT WHICH RETRIEVES INFORMATION AS BLOCKS OF DATA AND OUTPUTS THE RETRIEVED DATA VIA A COMMUNICATIONS LINK

This is a Divisional of application Ser. No. 08/136,185 filed Oct. 15, 1993.

BACKGROUND OF THE INVENTION

1. Field of the Invention

The present invention relates to network elements capable of providing new and enhanced broadband, information-related services to consumers. Specifically, the present invention provides the ability to receive and respond to diverse subscriber requests by transmitting information of virtually any kind. The information transmitted can include movies, video games and other entertainment programs, educational information and programs, scientific and other research-related database information, and the like, and is hereinafter referenced generically as "information" or "titles".

2. Description of the Related Art

Consumer demand for enhanced on-site entertainment and information services is on the rise. Examples of such entertainment and information services include so-called "on-demand" video, interactive video games, database research, "home-shopping" and the like. Numerous service providers are currently eager to tap this demand, and are therefore expressing interest in schemes for providing such services to consumers. The efforts currently being expended by service providers, as well as the current state of progress in this field of technology are described, e.g., in TIME Magazine, Apr. 12, 1993, at 49ff., and Newsweek, May 31, 1993, at 39ff.

In order to be economically practical and viable, a system offering the wide range of information-related services just described should preferably be able to (i) permit access to large volumes of data (i.e., to a large number of titles), (ii) service a large number of consumers, and (iii) transfer data (i.e., titles) to the end user quickly, preferably in "real time". Further, the consensus prefers a system arranged as a centralized facility capable of communicating with remote stations (e.g., homes, offices, public gathering locations, etc.) via existing or next-generation communications media.

Particular on-going efforts related to the present invention include a system being developed by Broadband Technologies. General elements of the Broadband Technologies system, as understood, are illustrated in FIG. 15. As shown, a subscriber's remote location 151 is connected over a standard telecommunications network 152 to a central facility 153. The central facility 153 awaits service requests from its subscribers.

When a given subscriber wishes to view a selection (e.g., a movie), he or she places a telephone call to the central facility using a standard telephone 154. The call is routed via standard telephone switches 155 (e.g., EO and AT switches) over the telephone voice path of a standard telephone line 156 (e.g., 24-gauge twisted pair copper wire). The telephone call is directed to a Voice Response Unit (VRU) 157 located in the central facility. The VRU forwards the subscriber request to an on-site attendant 158, e.g., through a paper printout. The operator 158 reviews the request, then retrieves the requested selection from an in-house library 159. Finally, the operator 158 locates an available playback unit 170 in a playback battery 171 and loads and plays the selection accordingly.

The output signal of the playback unit 170 is supplied to an interface unit 172 coupled between the playback unit 170 and the VRU 157 in the central facility 153. The interface 172 compresses the signal received and forwards the compressed signal via the VRU 157 to the telephone voice path of the telephone line 156. From there, the signal is routed to the subscriber's telephone 154, where a further interface 173 retrieves the signal, decompresses it, and passes it to the subscriber's television set 174.

As such, the Broadband Technologies system succeeds in providing an adequate transfer of video data over existing switches and transmission lines. First, the signal received at the remote location 151 corresponds in quality approximately to that of a conventional slow-play VHS mode signal. Furthermore, this system, while not truly "interactive", does provide limited system responses to remotely transmitted user requests. However, the system suffers under a range of inefficiencies, limitations on size and flexibility, and limitations or interactiveness, discussed in greater detail below. Finally, the system requires direct linkage to the subscriber's telephone 154, which monopolizes the telephone line and requires electrical connection between the telephone and television.

An additional pilot system being developed, known as the AT&T Leesburg Project, overcomes at least some of the problems noted above. General elements of the Leesburg system, as understood, are illustrated in FIG. 16. As apparent from the figure, the Leesburg system is very similar to the Broadband Technologies system, except that the request and response signals are not routed via standard telephone lines. Instead, the request and the response transmission are routed between the remote location 161 and the central facility 163 via a fiber-optic cable system 162.

In operation, a subscriber request is initiated via a customized telephone or control unit 164 connected to a special cable converter box 165 installed at the remote location 161. The request is transmitted over the fiber system 162 to a Voice Response Unit (VRU) 166 located at the central facility 163.

The operations at the central facility are the same as those described above with respect to the Broadband Technologies system, as indicated by the use of like reference numbers. The output signal of the playback unit 170 is supplied to an interface unit 167 directly coupled to the fiber system 162. The special cable converter box 165 at the remote end retrieves the signal and passes it on to the subscriber's television 168.

Since the Leesburg system benefits from the larger data transmission capacity of fiber-optics over standard copper wire (approx. 150 Mbits/sec versus approx. 1.5 Mbits/sec), the resulting quality of the data signal is enhanced relative to that of the signal delivered by the Broadband Technologies system. Moreover, this system does not monopolize the subscriber's telephone line. However this system fails to overcome the other problems noted, namely inefficiency, limitations on size and flexibility, and limitations on interactiveness.

The problems inherent in these systems, mentioned briefly above, will now be described more particularly.

The first class of problems involves inefficiency. First, no system yet proposed is fully automated. The human involvement and interaction required renders such systems costly, fallacy-prone and sluggish in response time. Second, pronounced redundancy between subscribers and playback capacity is required. In other words, the system must dedicate one VCR per concurrent user per average title duration. Further, the system must stock multiple copies of each title in order to cover overlapping requests. Clearly, this redundancy adds tremendously to overall cost and complexity of the system. Moreover, the arrangement is very wasteful, given that certain selections (e.g., first-run movies) are extremely popular for a time and then drop dramatically in popularity.

The second class of problems involves limitations on size and flexibility of the overall system. More specifically, given the redundancies discussed above, any system designed in this manner is inherently limited in the number of subscribers that can be accommodated and in the number of selections (titles) that can be offered.

The third class of problems relates to interactiveness. In each of the systems described, the user merely requests and views the title selected. As designed, the systems are incapable of providing more versatile or elaborate options that would require greater interaction between the user and the system. Examples of possible options available from a more powerful system include obtaining information to assist the user in selecting a title, selecting and reviewing previews of titles, adjusting playback of titles (e.g., pause, fast-forward, etc.), selecting between original language and dubbed versions of titles, etc. Further, truly interactive services are foreclosed from the described systems. Such interactive services of interest to consumers include on-line database searching, networked remote-station video-game competitions, personalized home shopping, and the like.

SUMMARY OF THE INVENTION

In view of the deficiencies and limitations of the systems currently being developed, the present invention addresses the following objects:

(i) to deliver data over conventional or modernized communication networks;

(ii) to deliver large amounts of data, and preferably to deliver data streams sufficient to display, e.g., an NSTC signal;

(iii) to deliver data rapidly, and preferably to deliver data sufficiently rapidly to allow the user to receive or interact with the data without perceptible delay (i.e., in "real time");

(iv) to deliver a given data set to multiple end users, preferably with the ability to accommodate large numbers of consumers;

(v) to deliver a given data set at the same time to multiple end users;

(vi) to deliver plural data sets to multiple end users;

(vii) to deliver plural data sets at the same time to multiple end users;

(viii) to deliver data in an economical fashion, without the pronounced redundancy noted with respect to systems currently being developed;

(ix) to deliver data relatively cheaply, quickly, and dependably, using automated procedures; and (x) to provide a system capable of being easily and cost-efficiently scaled to the requirements of the locality in which it is operated.

These and other objects are solved by the present invention in its various embodiments. In its most general formulation, the present invention provides a method and an apparatus for communicating data from a central station to a remote station over some form of communications path.

The data which together form at least one title, are stored on at least one storage device. The data forming that title are then retrieved as data blocks, independently of other data blocks, from storage. Each data block is a sequential segment of the data. Finally, the retrieved data blocks are transmitted from the central station to the remote station.

According to preferred embodiments, two types of storage devices are provided. The first type, preferably formed as an array of playback units, allows the data to be stored as data blocks and distributed accordingly over a plurality of storage devices. The second type, preferably formed as rings of solid state elements, provides a plurality of access points coupled to the storage medium, each of which is able to retrieve the data.

For further versatility in the system, the data blocks can also be transmitted independently of one another from the central station.

Preferably, the step of retrieving the data is performed in response to receiving a request for a given title.

BRIEF DESCRIPTION OF THE DRAWINGS

Preferred embodiments of the invention are described, by way of example, with reference to the accompanying drawings, in which:

FIG. 1 shows elements forming a communications system into which the present invention is incorporated;

FIG. 4 illustrates the division of a title into data blocks;

FIG. 5 illustrates one method of distributing titles over storage devices;

FIG. 7(a)–7(d) show embodiments of primary storage devices constructed as solid state memory rings, in which FIG. 7(a) illustrates the ring principle utilizing shift registers to form the ring;

FIG. 7(b) shows a specific preferred ring structure using CCDs; and

FIG. 7(c) and 7(d) show embodiments utilizing parallel-ring structures.

FIG. 10 is a flowchart illustrating how the system retrieves data from the primary and secondary storage devices;

FIG. 12 shows a preferred embodiment of the Information Signal Control Point of FIG. 1;

DETAILED DESCRIPTION OF THE PREFERRED EMBODIMENTS

FIG. 1

Figure 2:
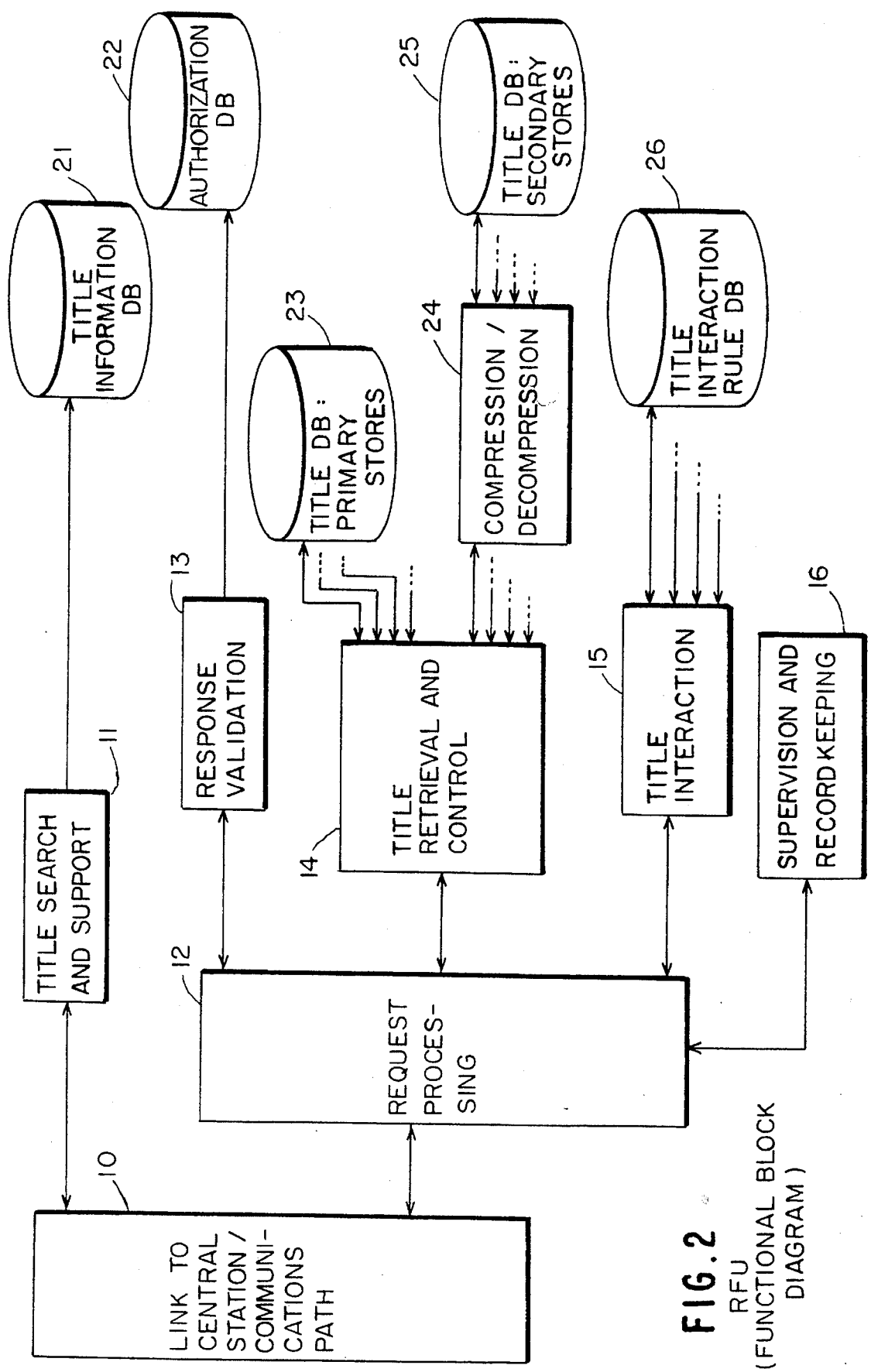
FIG. 2 is a functional block diagram of the Request Fulfillment Unit of FIG. 1.

FIG. 1 shows, in general terms, elements forming a communications system into which the present invention can be incorporated. The principles underlying the invention are not dependent upon features unique to particular communications systems. As such, it is possible to incorporate the present invention into a variety of communications systems presently existing or yet to be developed. Two examples of existing systems capable of supporting the present invention are a telecommunications network and a cable TV service.

If the Information Service Control Point (ISCP) is embedded in the Local Exchange Central Office of a telecommunications network, it can inter-operate with the network via a signalling protocol such as SS7 TCAP (Transaction Capabilities Part of Signalling System 7, as defined by the CCITT—an international standard) in a fashion analogous to a traditional telecommunications Service Control Point (SCP). Alternative signalling protocols acting as interfaces for a local telephone network include DTMF (Dual Tone Multi-frequency).

For Cable TV service providers, the ISCP functions as a basic service delivery system providing on-demand and interactive service capabilities. Signalling protocols capable of being utilized in a cable system include DTMF and Ethernet.

As shown in FIG. 1, the communications system includes a central station 1, a remote station 2 and a communication path 3 connecting the central and remote stations. The communication itself is composed of two parts, namely a signalling part (protocols) and a transmission part. Consequently, the communications path 3 includes both a signalling path 4 and a transmission path 5.

The present invention is not limited to any particular choice of transmission medium or transmission technology. Existing telephone or cable lines can be used. If narrow bandwidth media, such as copper wire or coaxial cable, are used, compression schemes can be employed to transmit data effectively. If door-to-door fiber-optic cable is available, this type of medium, given its broadband characteristics, is preferably employed. Digital cellular or satellite transmission techniques may also become feasible in the very near future.

In operation, communications back and forth between the central office 1 and remote station 2 are initiated at either end (1 or 2) and are transmitted over the communications path 3. Signalling portions of the communication travel over the signalling path 4, while data portions travel over the transmission path 5. Communication from the central office 1 to the remote station is generally referred to as the downlink path, while communication in the opposite direction is the uplink path.

The ISCP 6 is associated with the central office 1. In general terms, the ISCP 6 receives and responds to service requests via some predetermined signalling protocol over one or more switching points.

In order for communications to be sent and received by the ISCP 6 from the remote station 2, a subscriber interface 7 associated with the remote station 2 is provided. The construction and operation of the subscriber interface 7 depends on the nature of the service provider, and, specifically, on the network of the service provider within which the ISCP is embedded. The details of construction of the subscriber interface 7 are not material to the present invention.

When incorporated into a conventional telecommunications network, the ISCP 6 may receive service requests via SS7 links from an EO (end office) switch. The ISCP behaves as both an AT (access tandem) switch and as an SCP (Signal Control Point). Specifically, the ISCP mirrors an SCP in that it provides information via an SS7 link. It mirrors an AT since it provides service via a transmission path set up through the EO switch.

One simple method of obtaining service entails a local telephone call by the subscriber, who then interacts with the ISCP through system-generated prompts and DTMF signalling. The system-generated prompts can be delivered to the subscriber in any of various forms; e.g., simulated voice, video or facsimile.

When incorporated into a conventional cable TV service, the ISCP 6 provides transmission via a wire frame or similar arrangement. Subscriber messaging is accomplished via Ethernet or an analogous uplink path.

If existing subscriber premise equipment is available (as currently offered by some cable/hotel service providers) the ISCP is advantageously engineered to be compatible. Depending on the level of sophistication of the subscriber interface 7, various levels and types of interactive service can be offered.

The ISCP 6 is composed of various subsystems, the major subsystem of which is a Request Fulfillment Unit (RFU) 8.

FIG. 2

FIG. 2 is a functional block diagram showing a preferred embodiment of the Request Fulfillment Unit (RFU 8). The RFU is designed to provide subscriber service and interact with subscribers. Both functions are supported through the RFU's library, which is composed of various databases and operations algorithms, examples of which are described below. The RFU's library, described in greater detail below, can be either an on-site facility, a remote facility, or a combination of on-site and remote facilities.

As shown in FIG. 2, the subscriber interaction function is enabled by a link 10 to the communications path 3. The subscriber service functions themselves are enabled through various operations algorithms (processing capabilities) 11–16 and through databases 21–26 corresponding to the various operations algorithms 11–16. These algorithms 11–16 and databases 21–26 will be described in greater detail below.

FIG. 3

Figure 3:
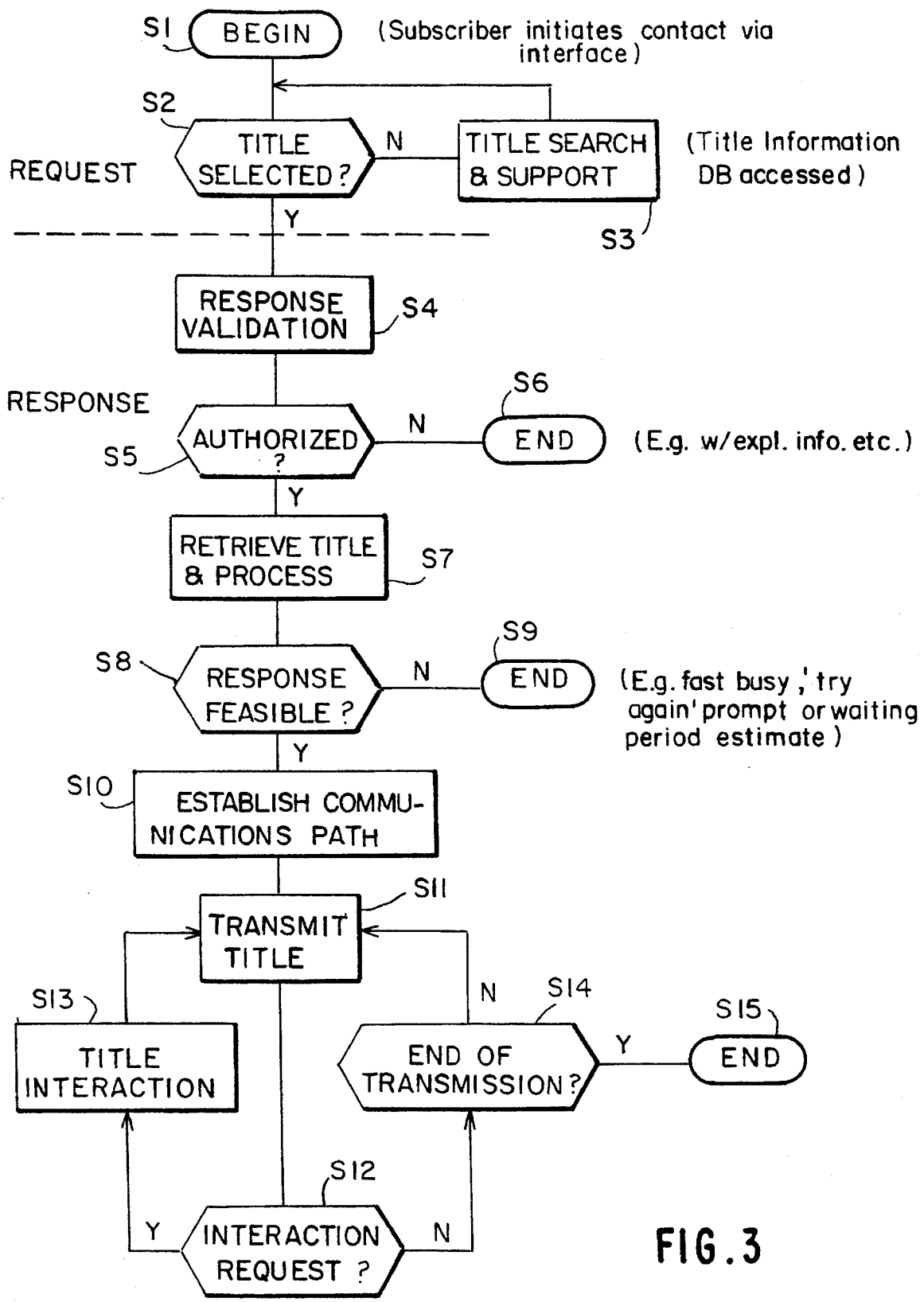
FIG. 3 is a flowchart for illustrating communication between the Information Signal Control Point and the subscriber interface of FIG. 1.

FIG. 3 is a flowchart for illustrating communication between the ISCP 6 and the subscriber interface 7, and for illustrating the ensuing operation of the RFU 8.

Communication begins when a subscriber initiates contact with the ISCP 6 via the subscriber interface 7 (step S1). As described above, the format of the communication depends upon the communications system employed and can be designed to be compatible with existing systems. I.e., if embedded in a telephone network, communication between the ISCP 6 and the interface 7 would include signalling protocols, such as SS7/TCAP or DTMF, transmitted over the signalling path 4 and data transmitted over the transmission path 5 (FIG. 1). If embedded in a cable network, the communication would include signalling protocols, such as Ethernet or DTMF, transmitted over the signalling path 4 and data transmitted over the transmission path 5.

The communication can be either a direct request for a specific title or a more general request requiring further interactive communication between the RFU 8 and the interface 7. The RFU 8 recognizes whether the request is specific or general, and processing branches accordingly (step S2).

If the request is general, the RFU 8, through its title search and support function 11, coupled with a title information database 21, responds with a service that permits subscribers to interact with the ISCP 6 until they have found the specific title(s) they wish to request. The title search and support function 11 permits access to one or more databases of information about the titles on store. This information may contain entries regarding actors, directors, ratings, awards, critical reviews, country of origin, etc. The information accessed is supplied via the link 10 and the interface 7 to the subscriber. Various formats may be employed to facilitate this phase of interactive communication, such as menu screens, voice prompts, etc. (step S3). This phase of interaction ends when the subscriber has requested one or more specific titles (step S2).

While they can be interactive, steps S1–S3 are concerned only with the title request aspect of service. Steps S4–S15, on the other hand, involve the RFU's response to the request. In other words, steps S4–S15 relate to request fulfillment. Request processing 12 ensures that the RFU 8 properly responds to any specific request received by any subscriber, and acts as an interface between the RFU's response library 13–16, 22–26 and the transmission link 10.

Once one or more specific titles are chosen (step S2), the RFU 6 initiates a validation procedure to ascertain whether the particular subscriber is authorized to view or otherwise interact with the title that has been chosen (step S4). In order to accomplish this end, the RFU includes a response validation function 13 operationally connected to one or more authorization (subscriber profile) databases 22. The database 22 contains lists of valid subscribers and lists of service profiles. Service profiles are categories of service options available to the subscriber from the service provider. One example service option is an access restriction to certain titles (e.g., premium titles, movies with restricted ratings, etc.) that is either complete or contingent upon a certain code or password being entered.

Based on the information contained in the authorization database 22, the RFU 8 determines whether the subscriber's request is authorized or not (step S5). If the request is unauthorized, the request is not fulfilled (step S6). If desired by the service provider, the RFU 6 can be structured to provide the subscriber with information explaining the reasons why the request is not authorized, or with other information helpful to the subscriber.

If the requested title is authorized, it is retrieved from storage by the RFU 6, in preparation for transmission of the title to the subscriber (step S7). Title retrieval and delivery is controlled by a title retrieval and control function 14. This function 14 accesses one or more databases 23, 25 on which the various titles offered by the service provider are stored. Compression techniques may be advantageously employed. FIG. 2 therefore shows, by way of example, a compression/decompression function 24 inserted between the title retrieval and control function 14 and the database 25. Further details regarding title retrieval and control are described hereinafter with reference to FIG. 10.

According to the preferred embodiment, the RFU employs a variety of storage device technologies. These include, but are not limited to, Random Access Memory (RAM), Digital Audio Tape (DAT), Read-Only Memory embodied in compact disk format (CD-ROM), Optical Juke Boxes, and Silos. Important criteria underlying the choice of particular storage devices are the need for short access time and cost constraints (i.e., a relatively low average cost per bit stored). The devices currently available that meet these criteria are all sequential-access-type storage devices, such as those enumerated above.

The storage device technologies employed are preferably subdivided into two general categories.

The first category is reserved for popular titles and is stored in one or more primary storage units 23. The primary storage unit(s) 23 are devices, preferably of a sequential-access type, that permit especially rapid access to the data stored. As noted earlier, the data may or may not be compressed depending on the requirements of the system implementing the invention. Further details describing preferred methods of storing the data in the storage unit(s) 23, which enable multiple subscribers to receive the same title at the same time, are provided below in conjunction with FIGS. 4–8.

The second category of storage device technology is used to store titles not as frequently requested. This category, consisting of one or more individual units, is indicated in FIG. 2 as secondary storage unit(s) 25. Again, the data may or may not be compressed. While the unit(s) 25 are not as efficient as the primary unit(s) 23, they are less costly to manufacture and maintain, thereby reducing the cost of the overall system. However, even though less efficient, the data held in the unit(s) 23 can nonetheless be stored according to the preferred methods described hereinafter (FIG. 4–6 and 9), permitting simultaneous access to a single title by multiple users.

The determination of whether to place a particular title on either primary storage unit(s) 23 or secondary storage unit(s) 25 is based upon title access history and/or expected demand. A supervision and record-keeping function 16 (FIG. 2) incorporated into the RFU 8 can be used to facilitate this determination by collecting statistics and forwarding them from the RFU 8 to other parts of the ISCP for processing.

Returning to the description of FIGS. 2 and 3, once the retrieval and control function 14 has accessed the storage unit(s) 23 or 25 containing the data for the specific title requested and has performed pre-transmission processing as needed (step S7), the RFU 8 determines whether it is presently capable of fulfilling the subscriber's request (step S8).

This determination is preferably performed as follows. The RFU 8 maintains the current ("real time") and future access states to the various storage devices 23, 25 for the "M" subscribers currently receiving service. The supervision and record-keeping function 16 can support this task as well. From this information and the new "M+1st" subscriber request, the RFU 8 is able to determine whether the "M+1st" subscriber request against the "M" subscribers receiving service is feasible. The point at which service is no longer feasible individual ISCP has been engineered.

If the RFU 8 determines that it is not feasible to fulfill the "M+1st" subscriber's request, then the RFU 8 will abandon response fulfillment processing (step S9). The inability to fulfill the request is be communicated to the subscriber in a manner determined by the service provider, e.g., a fast busy signal (preferably coupled with an announcement) as is currently used in telecommunications networks, an audio or video prompt to "try again" or an estimated waiting period calculated by the RFU 8 informing the customer when the request would become feasible.

If the RFU 8 determines at step S8 that it is feasible to fulfill the "M+1st" request, the ISCP 6 establishes a communications path to the subscriber's premises 2 (step S10) and commences transmitting the data that constitutes the title requested (step S11). The method by which steps S10 and S11 are executed is dependent on the communications network in which the invention is embedded. In other words, the ISCP 6 is engineered in such a way as to provide a (digital) interface to the communications facility of the service provider. This simply entails converting the bit stream corresponding to the data retrieved by the title retrieval and control function 14 into a format compatible with the service provider's network. If door-to-door fiber is available, the delivery can be via DS3 (Digital Speed Three) suitable for Digital TV. If the data is delivered over metal (e.g., over copper wire, as is still prevalent in current telecommunications networks), compression schemes known to those skilled in the art (e.g., lossy compression schemes such as fractal compression, or lossless schemes) are advantageously employed. Delivery over coaxial cable is equally feasible.

As mentioned previously, the ISCP 6 of the present invention preferably offers various levels and types interactive service. As such, the subscriber need not be limited to merely the passive reception of one or more titles selected. Rather, if offered by the service provider, the ISCP can provide the subscriber the ability to interact with a title as it is delivered, in accordance with any number of pre-programmed interaction rules. Accordingly, FIG. 2 shows a title interaction function 15 associated with a title interaction rule database 26 integrated into the RFU 8.

Thus, during the course of transmission, the RFU 8 awaits the receipt of an interaction request from the subscriber (step S12). Upon detecting such a request, the RFU 8 delivers an appropriate response dictated by the interaction rules governing the particular title being transmitted (step S13).

This interaction capability of the ISCP 6 permits an extremely wide range of services of interest to the consumer to be offered. The following list is merely exemplary of the many types of services that would be apparent to those skilled in the art upon reviewing the present disclosure:

(a) if the title requested is a movie or analogous broadcast, interaction requests may include: fast forward, reverse, cue, review, stop frame, etc.;

(b) if the title is a video game or similar interactive entertainment service, interaction requests may include: movement of pieces, characters, etc. across a gameboard, video setting, or the like;

(c) if the title is an information service, such as a scientific, medical, or legal database, interaction requests may include: specifying, narrowing, expanding, and changing fields of search, requesting related options such as printouts, cost estimates, etc.;

(d) if the title is an educational service, interaction requests may include: student questions, student responses to questions, etc.; and (e) if the title is a consumer catalogue or the like, interaction requests may include: directing the search for particular products or categories of products, obtaining specific additional information about products, placing and paying for orders, etc.

Various forms of subscriber response interfaces known and apparent to those skilled in the art are available to facilitate subscriber interaction. These include remote control units, keyboards, control pads, keyboards, and joysticks.

Subscriber interaction need not be limited to "one-on-one" interaction between the RFU 8 and the subscriber. First, just as multiple users may select a given title at the same time, multiple users can interact with a given title simultaneously in different ways. Additionally, the ISCP 6 allows groups of users to interact collectively with a particular selected title. Applications include simultaneous transmission of interactive educational titles to a group of subscribers, video game championships, etc.

Once the transmission of the title is completed, the RFU 8 registers this fact (step S14) and ends the transmission accordingly (step S15). The end of transmission can be communicated to the subscriber in a manner determined by the service provider. Alternatively to an actual disconnection, the end of title transmission can be followed by the transmission of further information, such as advertising or promotional material.

FIGS. 4–9

FIG. 4

In describing the storage units 23, 25, it was noted that the data forming individual titles is preferably stored and retrieved in a manner enabling multiple subscribers to receive the same title simultaneously. I.e., the ISCP 6 is preferably designed with the ability to handle simultaneous queues against a single title at a time. A general principle for storing titles, by which the present invention achieves this objective, is illustrated in FIG. 4. As shown in FIG. 4, the title 30 is subdivided into numerous individual blocks 1-n and stored. Each block contains only a small fraction of the overall data which, together, forms the entire title. Each "block" is a sequential segment of actual data.

FIG. 5 illustrates one method of distributing titles over storage devices. Each storage device is assumed to have only one read port. As shown, no given block x (where x=1 . . . n) of any one title y (where y=1 . . . m) is stored on the same physical storage device z (where z=1 . . . p) as block x of any other title. Further, no two blocks of any given title y are stored on the same physical storage device. If some or all of the storage devices have more than a single read port (access point), then the distribution illustrated can be modified accordingly using, e.g., one of various mathematical models known to those skilled in the art.

Once a title 30 is subdivided into blocks and stored accordingly, the blocks can be read in accordance with "random-access" methods analogous to conventional methods. It should be understood that, in computers and the like, there is actually no such thing as random access. All access involves, at best, the ability to address a sequential bit stream. In the case of random access in the form of hard drives, the actual data is read in sequential segments, i.e., in blocks. Data cannot be accessed directly in segments smaller than one block. However, to the user, hard drives appear to allow random access because, as compared with audio/video tape or other so-called "sequential access" technologies, the delay between request and fulfillment is imperceptible to the user. By making the blocks sufficiently small, inherently sequential devices are given the appearance of allowing "random access".

FIG. 6

According to the present invention, individual blocks can be retrieved from storage and transmitted to a subscriber independently of one another. In other words, if title 30 is requested by subscriber A and shortly thereafter by subscriber B, the transmission of block x to subscriber A will not prohibit the simultaneous transmission of block y to subscriber B (assuming x≠y).

Figure 6:
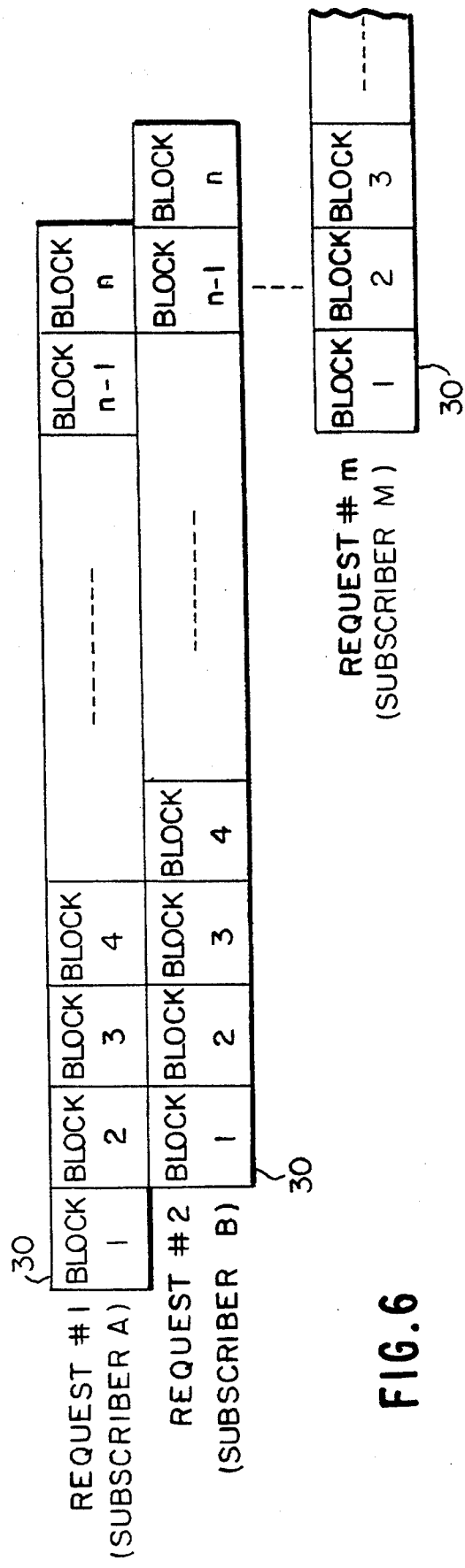
FIG. 6 illustrates the retrieval of data blocks in accordance with one aspect of the present invention.

Therefore, if each title is sufficiently finely subdivided, multiple users can request the same title even though the service provider stocks only one or a few copies of that particular title. In other words, the ISCP 6 improves over the prior art in that it allows multiple requests at random intervals for the same title to be serviced without the requirement that multiple copies of that title be kept in store. As illustrated in FIG. 6, requests from subscribers A, B . . . M, each for title 30, can be fulfilled, so long as two requests do not require retrieving and transmitting exactly the same block at precisely the same moment.

If each title is sufficiently finely subdivided, large numbers of users are able to request one and the same title virtually simultaneously. If sufficiently finely subdivided, any retrieval delay required to resolve a true overlap would be imperceptible to the user. Further, according to embodiments disclosed later in the application (see FIG. 11 and accompanying text), the invention can be implemented such that even truly simultaneous requests by multiple users can be fulfilled without contention or delay.

As a practical matter, the size of the individual blocks (i.e., the fraction of data defining a block; or the size of the bit stream packet defining a block) is determined by the "grade of service" offered by the ISCP 6. The "grade of service" is a compromise based on cost factors on the one hand and maximization of service on the other. The higher the grade of service, the more finely subdivided the title would be, and the smaller the size of each individual block. With an appropriately subdivided title, the "grade of service" becomes a relationship between peak subscriber demand, and connectivity between the subscriber's trunk processor and the data storage parallel access ports provided (see FIG. 11 and accompanying text).

FIG. 7

The above principles for storing and retrieving titles are employed by the present invention both in the primary storage unit(s) 23 and in the secondary storage unit(s) 25. However, preferably, these principles are implemented in a different manner for these two categories of storage devices. As noted earlier, the choice between the two categories of storage devices is governed predominantly with consideration to subscriber access.

The most popular titles, and perhaps others requiring especially efficient serial access, are stored in primary storage unit(s) 23. These unit(s) 23 are preferably solid state memories, allowing the (popular) titles to be played back directly.

The preferred manner of embodying such solid state memories is shown in FIG. 7. FIG. 7(a) shows a long series of clocked shift registers 41 connected to form a ring 40. The ring 40 is constructed such that an entire title is contained encoded in such a way that data integrity is guaranteed. Error correction codes available for this purpose, e.g., Reed-Solomon Code, are known to those skilled in the art. The ring 40 is clocked by a clock source 42 which governs the rate of circulation of the data through the ring. The ring 40 is clocked at such a rate to deliver (i.e., output) the title at a rate required by the receiver.

Figure 7A:
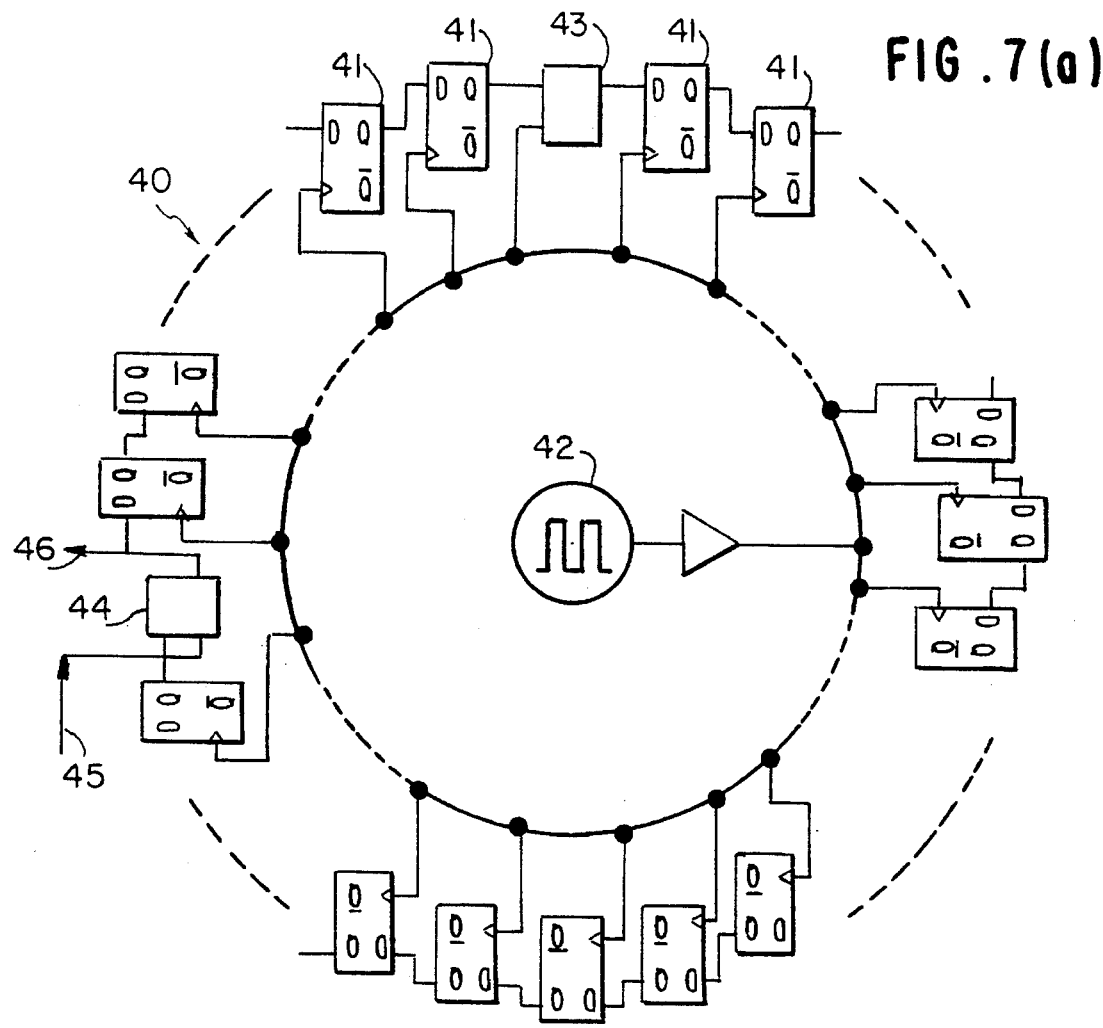

If the clock rate required cannot be attained by one shift register, many registers in parallel can be used to obtain the rate required. FIG. 7(c) illustrates one possible such embodiment in which two parallel rings are constructed, each comprising clocked shift registers 41 connected in series. FIG. 7(d) illustrates an embodiment in which shift registers 41 are interconnected in series and in parallel to form the ring 40. The rate required is determined largely by the requirements imposed by the service provider.

The data forming the title passes through the shift registers 41 serially as a sequential bit stream. The data is passed from one register 41 to the next in a manner explained in greater detail below.

As described in general terms with reference to FIGS. 4 and 6, the actual data is read in blocks, i.e., in sequential segments. This can be achieved by placing logic devices 43, 44 in the ring at predetermined intervals. The size of the intervals is determined by the desired size of the data blocks. FIG. 7(a) shows two types of logic devices, regenerators 43 and ports 44 coupled into the register ring 40.

Figure 8A:
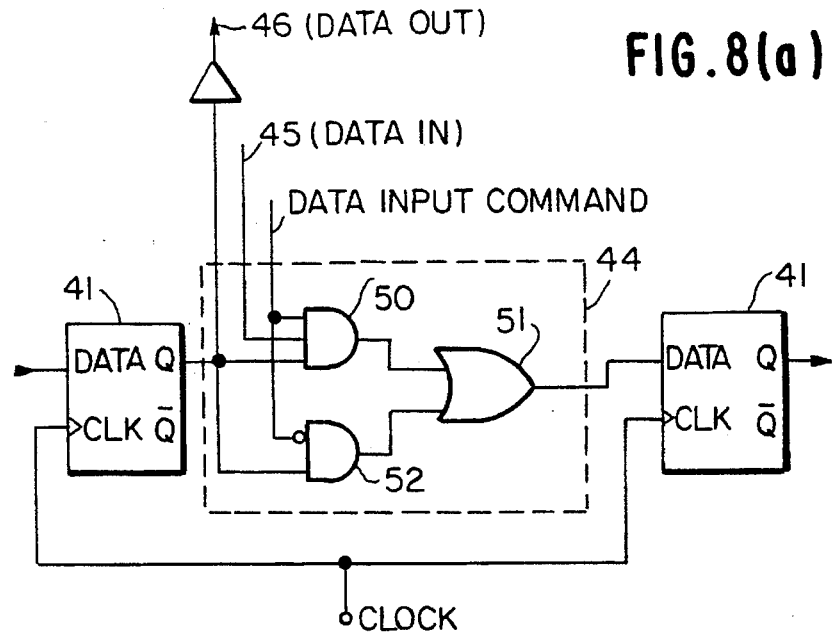
FIGS. 8(a) and 8(b) show a data port and a data regenerator inserted into the ring, respectively.

The access to the title stored in the ring 40 is obtained via the data ports 44. An example of a port 44 is shown in FIG. 8(a) coupled between two registers 41. As illustrated there, the ports 44 are preferably composed of logic circuitry 50–52. In addition to an input connected to the register 41 preceding it, each port 44 has an input for receiving a bit stream input 45. Data for a new title is inserted into the ring 40 via inputs 45. In addition to an output connected to the following register 41, each port 44 also has an output 46 for copying the bit stream circulating in the ring 40. The number (spacing) of ports 44 included in the ring 40 is based on an efficiency determination, balancing overall cost against access time. The spacing of the ports 44 defines the size of the data blocks, and thus determines, in part, the waiting time between a subscriber request and fulfillment. If the title is accessible in sufficiently small blocks, the delay time is imperceptible by humans.

Figure 8B:
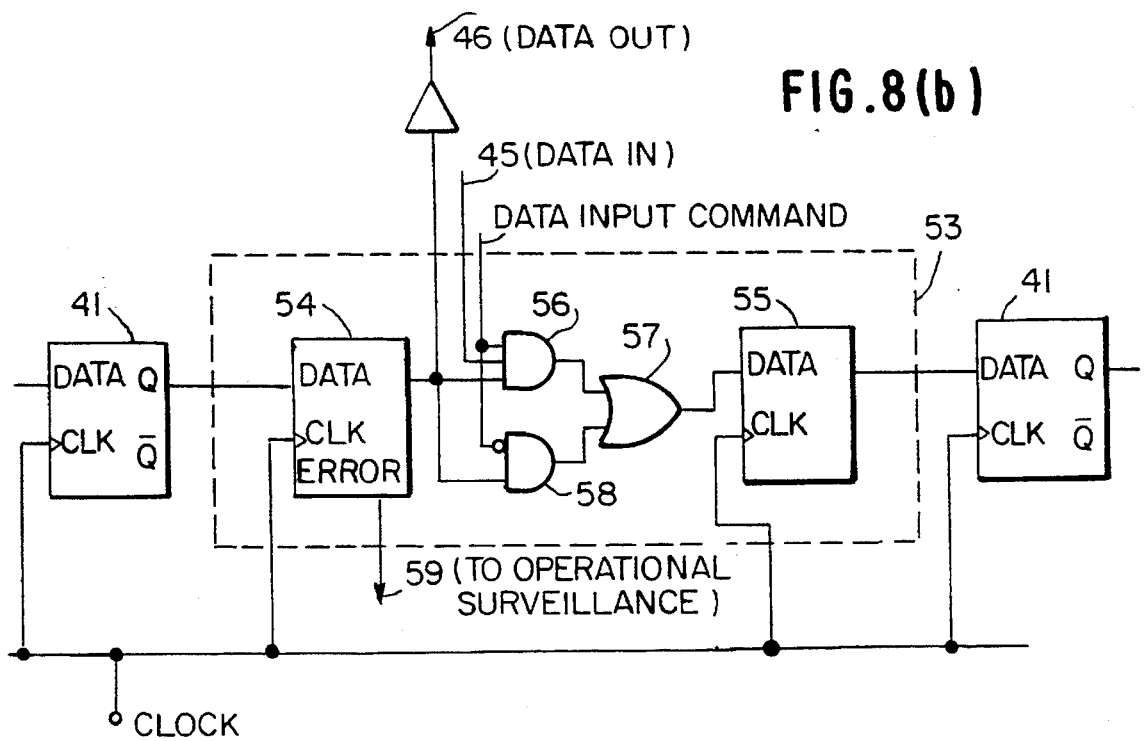

The embodiment of FIG. 8(a), described above, has no provision for error correction between registers. As shown in FIG. 7(a), regenerators 43 can be inserted periodically in the ring 40 such that blocks of the title stored in the ring are regenerated as they pass through the regenerator. FIG. 8(b) shows in greater detail an embodiment in which the regenerator 43 is formed as a data checker 53 inserted between the registers 41. Each data checker 53 preferably contains logic circuitry 56–58 as well as a decoder 54 and an encoder 55. These are preferably a Reed-Solomon decoder and Reed-Solomon encoder, respectively. The decoder 54 receives the data stream at an input, outputs any errors detected via an output 59, and outputs the decoded data to the logic circuitry 56–58. The output 59 leads to operational surveillance units to be described later in this application. Similarly, the data stream is input into the encoder 55 and output as an encoded data stream to the next following shift register 41. Regeneration occurs as the bit stream passes through the Reed-Solomon decoders/encoders. Thus, errors can be corrected and/or brought to the attention of surveillance equipment.

As such, each ring is structured to allow data to be placed into the ring and copied from the ring. Further, each ring is able to detect and repair errors automatically. If excessive errors arise, this fact is signalled to the surveillance equipment, such that the ring can be taken temporarily out of service and repaired.

The details of construction of the circuitry of the ring 40 are not particularly important in the present invention. The shift registers 41 can be constructed simply of standard logic circuits. These include TTL (Transistor-Transistor Logic), CMOS (Complementary Metal Oxide Semiconductor), ECL (Emitter-Coupled Logic), I2L (Current Injunction Logic), NMOS, PMOS, DTL, RTL or the like.

Figure 7B:
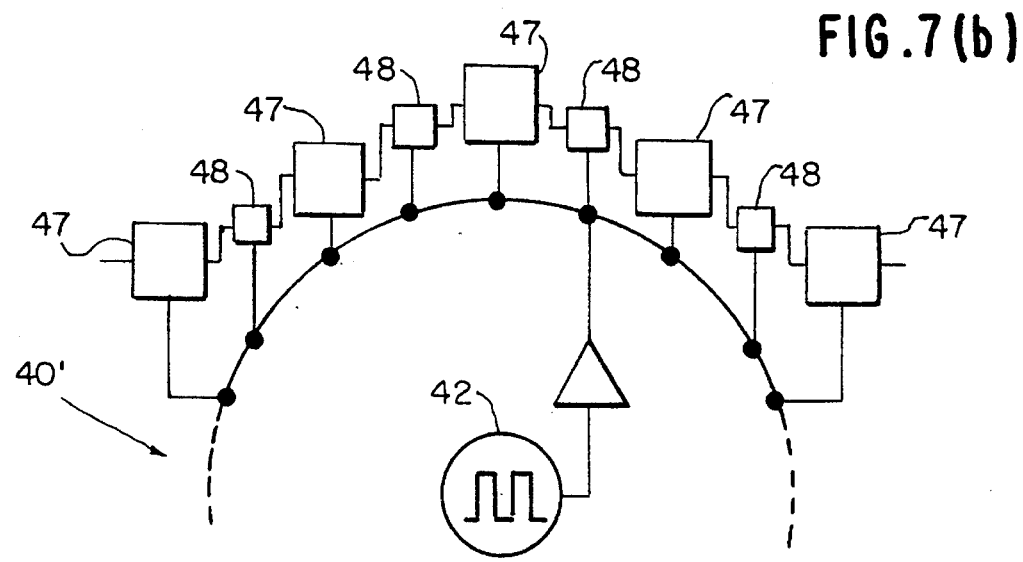
Figure 7C:
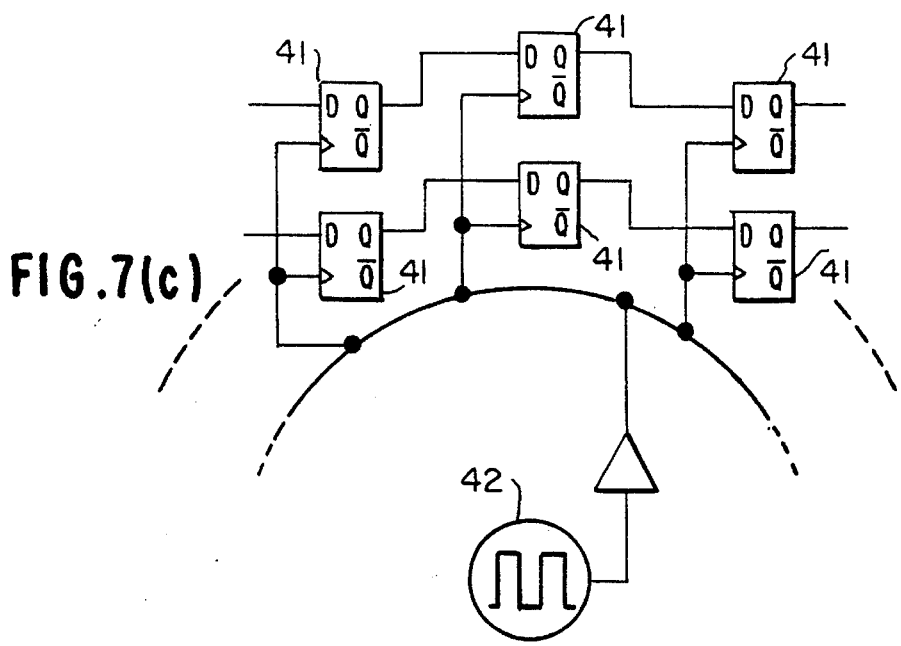
Figure 7D:
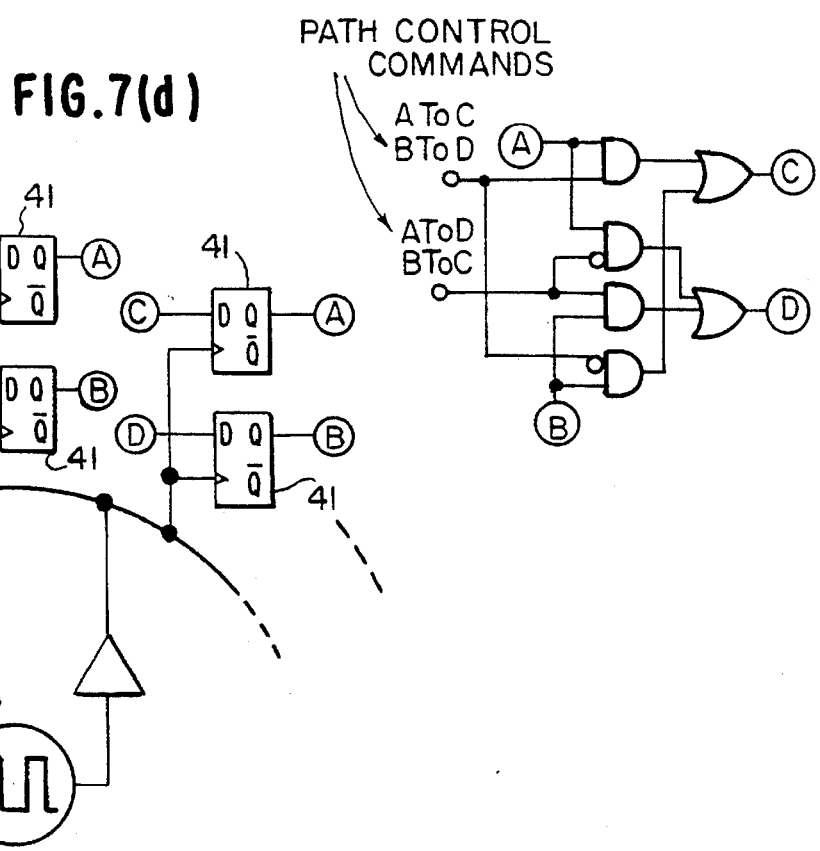

A further, preferred alternative is to employ CCDs 47 (Charge-Coupled Devices) as the registers 41, as shown in FIG. 7(b). If the ring 40' is constructed using CCDs 47, then each CCD 47 must be pumped by a clock source 42. Further, some form of regenerating means 48 must be coupled between each CCD 47. Possibilities for the regenerating means 48 include logic gates, as above. The individual CCDs simply function as registers in this embodiment.

The theory of operation for all the embodiments above, however, is the same. In each case, the data of which the title is composed circulate in the ring 40 and are regenerated as needed. Whenever a subscriber requests the title, title retrieval software (see function 14 in FIG. 2) responds by finding the current location of the start of the title. Ports coupled into the ring 40 are then actuated such that the title can be read in a serial fashion from the title's beginning. As such, the present invention encompasses any method that allows a signal (i) to cycle in a loop, (ii) be accessed in small blocks, and (iii) to keep its integrity.

There is no limitation as such on the size of the loop. Preferably, however, the loop should be sufficiently long to contain at least a significant fraction of one complete title. More preferably, each loop is dedicated to a single title. More than one title can be stored in one ring if desired.

FIG. 9

While highly efficient, the method just described for storing popular titles is relatively costly. Therefore, less popular titles (i.e., titles not as frequently requested and thus requiring a less exacting grade of service) are preferably stored in the secondary storage unit(s) 25.

The secondary storage unit(s) 25 also employ the principle of storing and reading titles in blocks, i.e., in sequential segments, as explained with reference to FIGS. 4–6. However, this principle is implemented somewhat differently than just described with reference to FIGS. 7 and 8. Rather than storing title blocks sequentially in a ring of circulating data, discrete blocks of the title are stored independent of one another on playback units of one form or another, so that each block can be independently retrieved and played. The blocks can be stored on a single playback unit with multiple reading heads, or, preferably, be stored in distributed fashion over several playback units. When a subscriber request is received, the RFU 8 then assembles (queues) the individual blocks into a sequential string corresponding to the entire title. This storage procedure is illustrated in FIG. 9.

Figure 9:
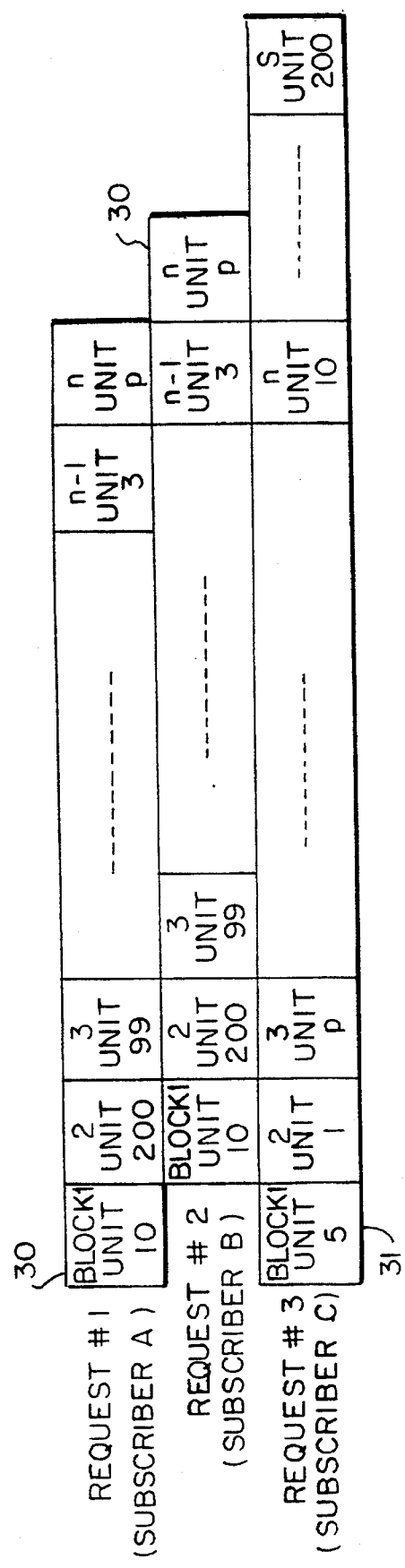
FIG. 9 illustrates a storage method utilized by the secondary storage devices of the present invention.

Similarly to FIG. 6, FIG. 9 illustrates queuing strings prepared for subscribers A, B, C . . . . Multiple subscribers A and B have requested title 30. Also, title 31 has been requested by at least one subscriber C simultaneously with subscriber A's request. Unlike FIG. 6, FIG. 9 additionally depicts the storage location of each block 1 to n of title 30 and of each block 1 to s of title 31. As can be seen from the figure, the individual blocks of the title are distributed over several or many storage devices 1 to p.

In addition to utilizing multiple storage devices 1 to p, the individual blocks 1 to n and 1 to s are preferably distributed to minimize contention in playback. Thus, contentions between subscribers for one title 30 are minimized by placing only a single block of that title 30 on any given storage device. Further, contentions between subscribers for one time slot are minimized by distributing block number x ($1 \leq x \leq n$, s, etc.) of respective titles 30 and 31 among storage devices in a manner that any given storage device contains block x for only a single title. Thus, most preferably, no more than one block of a particular title is placed on any one storage device, and no two of the same sequence numbers of different titles (e.g., block 1 of title 30 and block 1 of title 31) are placed on any one storage device (see FIG. 5). By distributing the titles in this way, the delay time required to fulfill any request is typically no longer than the time equivalent of the length of one block of a title.

The storage medium of choice for implementing the secondary unit(s) 25 is CD-ROM. However, as previously noted, a wide range of alternative storage technologies are available. These include DAT, optical juke boxes, silos, and conventional magnetic tape. The possibility of mixing storage technologies is also available. Thus, in order to limit the cost of the overall system while still maintaining high-quality service, a service provider might desire to further subdivide the less popular titles according to popularity and apportion titles among some or all of the above technologies accordingly.

In summary therefore, the preferred machine architecture of the ISCP 6 permits a many-to-one relationship between subscribers and titles.

FIG. 10

FIG. 10 illustrates how the above storage principles can be utilized in the title retrieval and control function 14 of FIG. 2.

Processing begins at step S71 once the title requested by a given subscriber has been authorized (see step S5 in FIG. 3). The request for that title is then routed to the title retrieval and control function 14 (FIG. 2) in step S72. Function 14, at step S73, commences a search for the general location of the title. The title will be stored either in primary storage unit(s) 23 or in secondary storage unit(s) 25.

If function 14 ascertains that the data for that title is stored in one or more primary units 23 (step S74), algorithms are activated that tap the appropriate solid state memory 40 such that the requested title can be retrieved and copied from its beginning (step S75). For titles stored in primary units, the retrieval process ends thereafter (step S79), such that response processing (step S8 in FIG. 3) is resumed.

If, instead, function 14 finds the data for the requested title stored on one or more of the secondary units 25 (step S76), algorithms are activated that inventory the title (step S77). In other words, if the title is subdivided into data blocks and distributed among multiple storage devices, as explained in conjunction with FIG. 9, the algorithms match blocks to the storage devices on which those blocks reside. Then, once the locations of all of the blocks forming the title have been ascertained, algorithms are activated at step S78 which queue the blocks in their proper sequence so that the title data can be accessed in its sequential order. This can be done by constructing a playing table or otherwise assembling the individual blocks into strings. This branch of the retrieval process ends once the blocks are properly queued, and response processing proceeds (step S8 in FIG. 3) as above.

Figure 11:
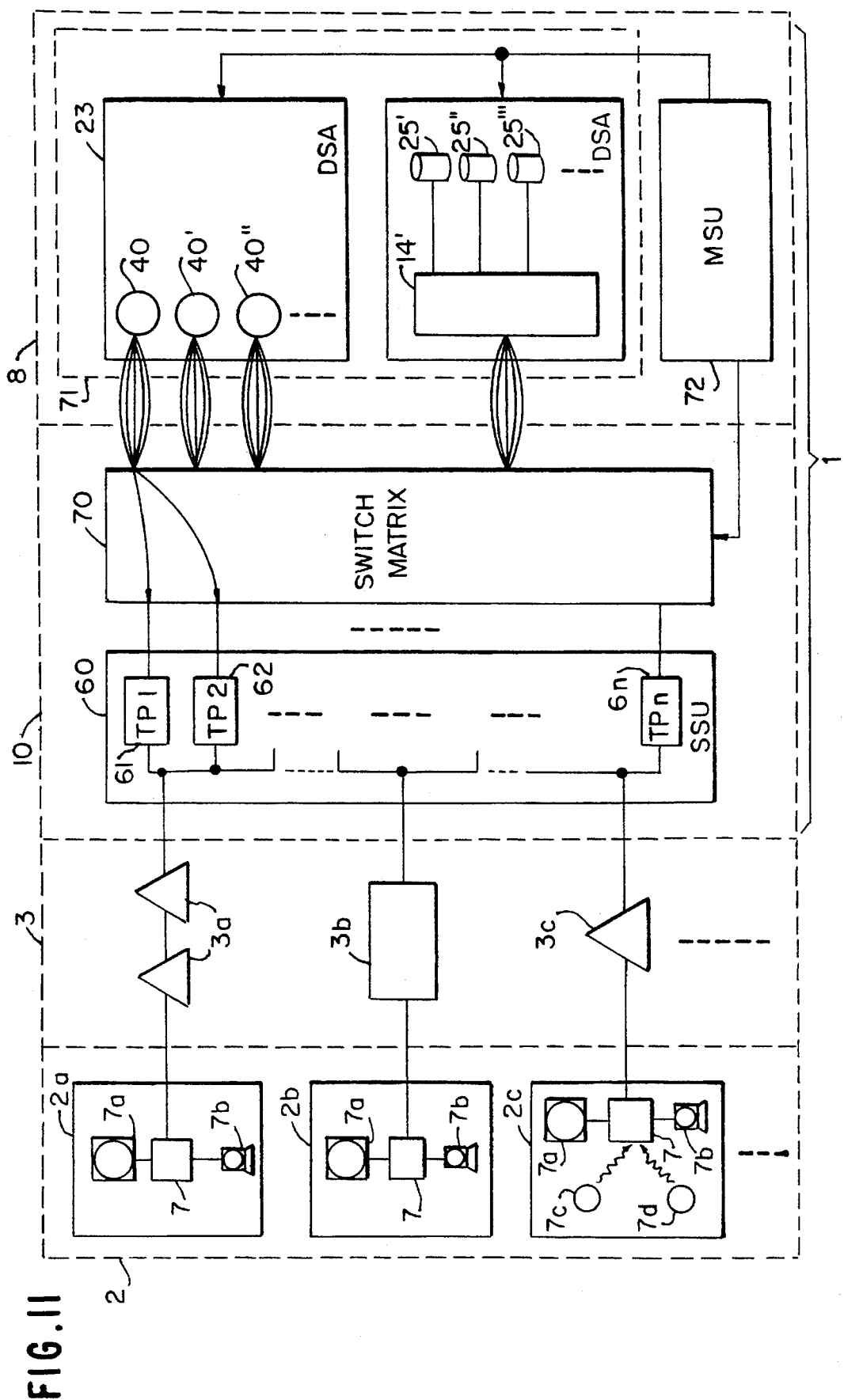
FIG. 11 shows a preferred system capable of receiving requests from and sending title data to subscribers.

FIG. 11 shows one preferred form for receiving requests from and sending title data to subscribers. As shown, the subscribers' remote stations 2a–2c, as well as the communications paths 3, can take a variety of forms known in the art or yet to be developed. A typical remote station could include, in addition to the subscriber interface 7 (previously described with reference to FIG. 1), one or more components such as a TV 7a and a computer 7b.

If communication proceeds via a telecommunications network, communication proceeds back and forth from the remote station 2a over various classes of switches 3a (e.g., EO and AT) to the central station 1. Similarly, communication over a cable network can be conducted from a remote station 2b over devices 3b, known as frames in the art. PCN or cellular communications from a cellular phone 7c or PCN terminal 7d at the remote station 2c over switches 3c is equally feasible.

The communications paths 3 are linked to the central station 1 through an SSU (Subscriber Service Unit) 60 consisting of an array of trunk processors 61 to 6n. There is preferably one trunk processor per subscriber. A switch matrix 70 acts as a link between the SSU 60 and the various storage units 23 and 25 in the DSA (Data Storage Area) 71. An MSU (Master Service Unit) 72 establishes switch paths between the DSA and an available trunk processor.

When a given title is requested by a certain subscriber (e.g., at remote station 2a), the MSU 72 locates the title in the DSA 71, locates a free trunk processor in the SSU 60, and commands the switch matrix 70 to set up a communications path between the DSA 71 and the SSU 60. The title is either directly copied from the appropriate primary store 23 or is reconstructed into the proper sequence of blocks retrieved from the secondary stores 25. Following setup of the communications path, the title is then supplied to the subscriber at remote station 2a.

Once the title is extracted from the DSA 71, the number of subscribers to which it can be played is unlimited. Therefore, if multiple subscribers request a given title at approximately the same time (e.g., within one block or several blocks of one another), then these multiple subscribers can nonetheless be simultaneously serviced. This is accomplished by the switch matrix 70. For example, if remote stations 2a and 2b simultaneously request title A, the switch matrix 70 will copy the bit streams for that title A to both of the relevant trunk processors (e.g., 61 and 62 in FIG. 11) in the SSU 60.

FIGS. 12–14

FIG. 12

FIG. 12 illustrates a preferred embodiment of the ISCP 6. As shown, the ISCP 6 contains several other subsystems besides the RFU 8, such that the overall ISCP 6 has a distributed architecture. The distribution is organized and segregated according to the general functions performed by each subsystem (application segmentation).

The functions of the RFU 80 in receiving subscriber requests and responding by providing information and service have already been explained in detail. The Operation Support Unit (OSU) 81 is responsible for surveillance, command and control (data gathering and system oversight). The Administrative Support Unit (ASU) 82 fulfills numerous administrative responsibilities arising when the ISCP is operated in a Production environment. These include capturing title images for library archiving, providing service profile management services, and providing subscriber billing information. An Image Capture Subsystem Unit (ICSU) 83 is functionally integrated into the ASU 82 in order to support the ASU 82 in its archiving responsibilities. The ICSU 83 can be either remotely or locally attached to the ASU 82.

The subsystems communicate over a common bus 84 that is internal to the ISCP. Preferably, the bus 84 is embodied as a sonet ring (Sonet is an international standard for transmissions over fiber-optic cable, governing framing, multiplexing and the like). The predominant consideration for choosing fiber as the internal bus is its high-bandwidth transmission characteristic, which permits rapid, high-density communication between the operational subsystems 80–83. It is further preferable that the internal system utilize RISC-based VME bus architecture. If embedded in a telecommunications network, each of the subsystems 80–82 is preferably a CCITT conformant network management element driven by CMIS.

FIG. 13

Figure 13:
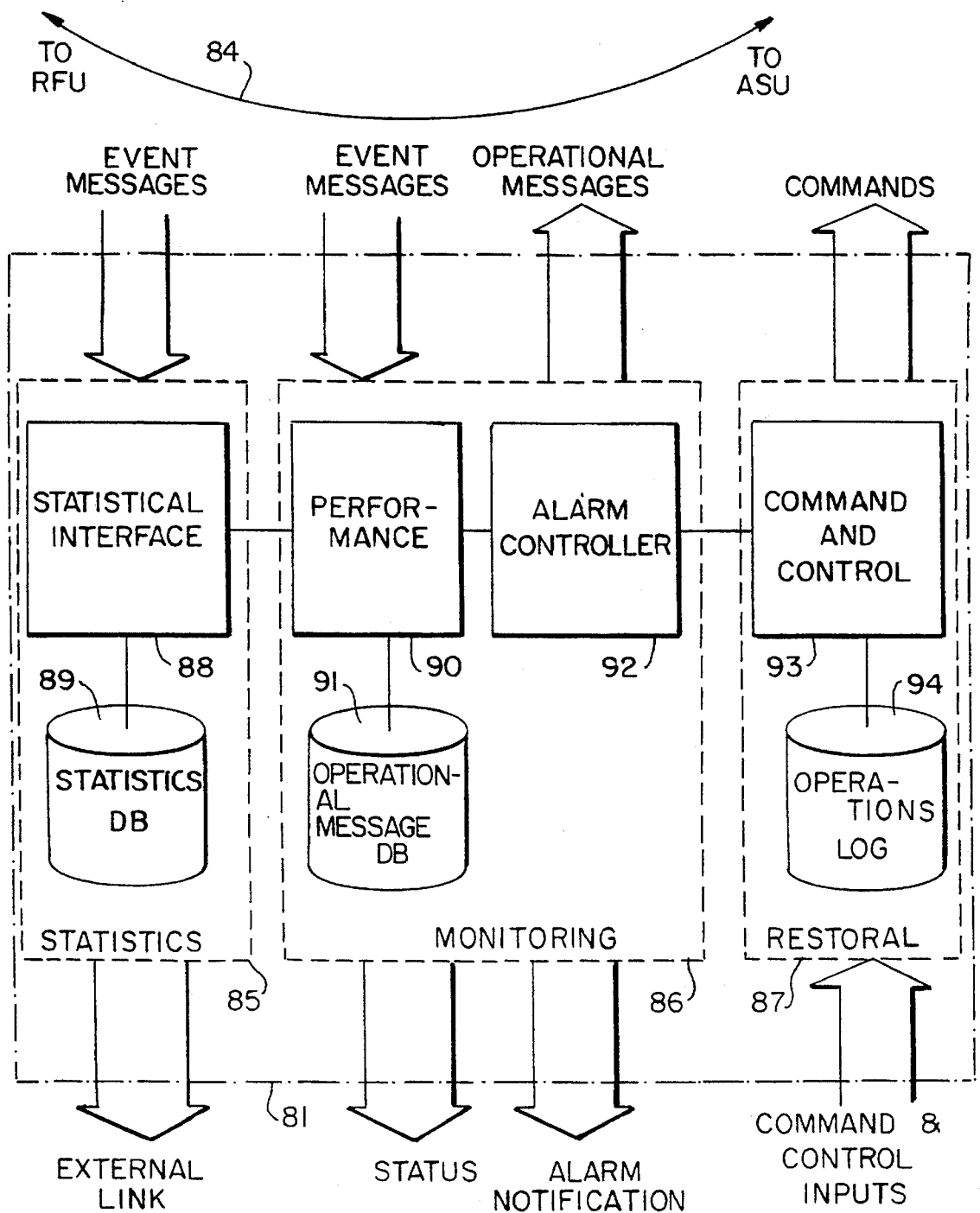
FIG. 13 is a functional block diagram of the Operation Support Unit of FIG. 12.

FIG. 13 illustrates the internal functioning of the OSU 81. The OSU's tasks are divided among gathering information and responding to the information obtained. More specifically, as shown in the figure, the functions performed by the OSU 81 can be subdivided into statistical data gathering 85, system monitoring 86, and system restoral 87.

Statistical information, e.g., system performance and subscriber usage statistics, are provided the OSU 81 either directly via a statistical interface 88 in the statistical gathering part 85, or via the system monitoring part 86. The statistics are stored for immediate or later use in a statistics database 89. The statistics data obtained can be processed and utilized by interested parties including the service providers themselves, researchers, etc.

Event messages, reflective of the internal operations of the ISCP 6, and in particular the RFU 8, are also utilized by the system monitoring part 86. The part 86 utilizes the event messages to keep all material components of the ISCP 6 under constant surveillance. To execute this operational surveillance function, the part 86 translates the event messages into operational messages (see performance interface 90).

If the ISCP 6 is embedded in a telecommunications network, the OSU converts event messages into Operational Part (OPART) messages, as is conventional for existing Signal Control Points. An operational message database 91 is provided.

The monitoring part 86 supervises every important aspect of the ISCP 6. By way of example, the integrity of the rings 40 and other internal components is ensured in this manner. External influences such as system power, room temperature, vibration, etc. are monitored as well.

Operational messages are routed to various destinations by the performance interface 90. If routed to an alarm controller 92, the messages are processed and forwarded to the restoral function 87, explained below. The controller 92, if necessary, also produces alarms, which can be passed on to beepers and phone messages via an alarm notification output. Finally, even during normal operation, the monitoring part 86 informs local and remote operators, who have access to all the subsystem components, of the exact status of the ISCP 6 at all times, as illustrated by the status line in the figure.

The restoral function 87 automatically determines responses to a variety of predetermined conditions or problems that can arise in the system. As such, when an alarm is passed from the alarm controller 92 to a command and control part 93 in the restoral function 87, data stored in an operations log 94, together with external command and control inputs, result in commands to other units and subsystems in the ISCP that address the conditions or correct the problems.

To illustrate, if the monitoring part 86 is informed that a given trunk or switch is out of operation, operations personnel is notified of this status and the restoral function 87 temporarily eliminates the problem by sending commands that re-route communications to avoid the damaged trunk or switch.

FIG. 14

Figure 14:
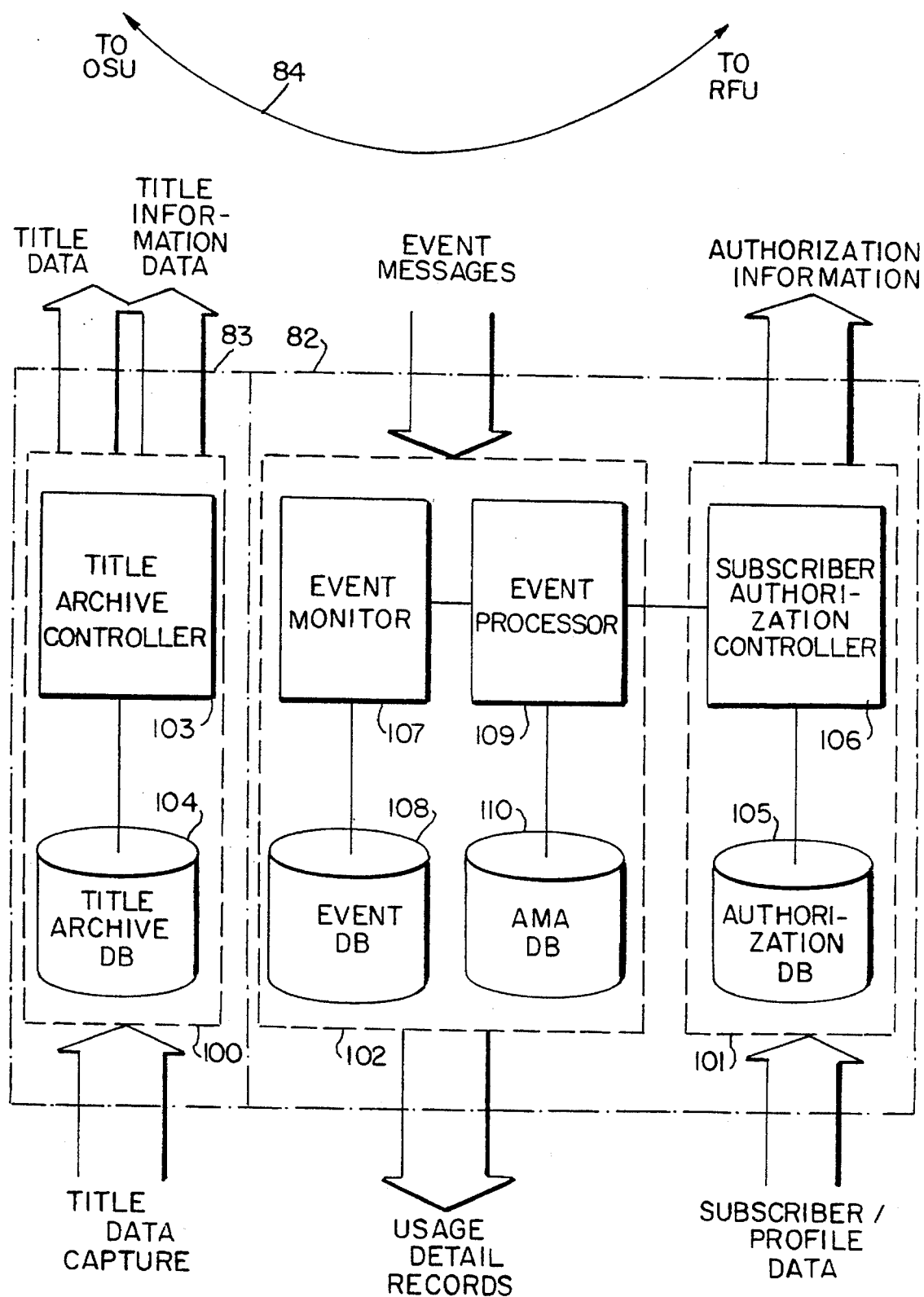
FIG. 14 is a functional block diagram of the Administrative Support Unit of FIG. 12.
Figure 15:
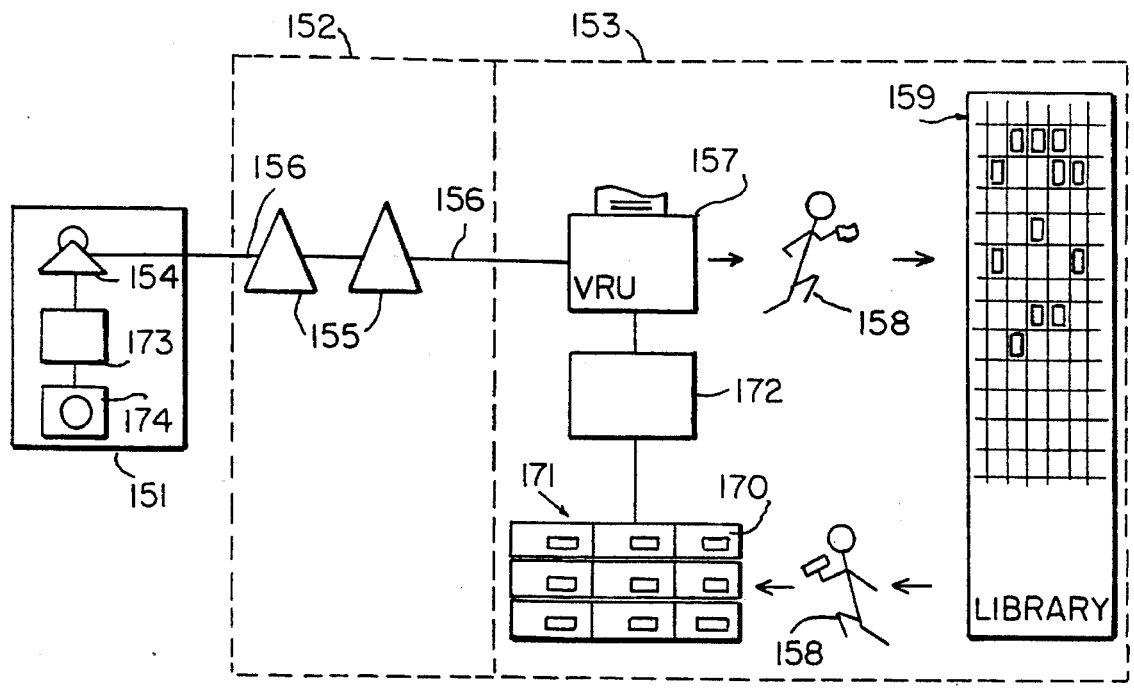
FIG. 15 shows a first related art system currently under development.
Figure 16:
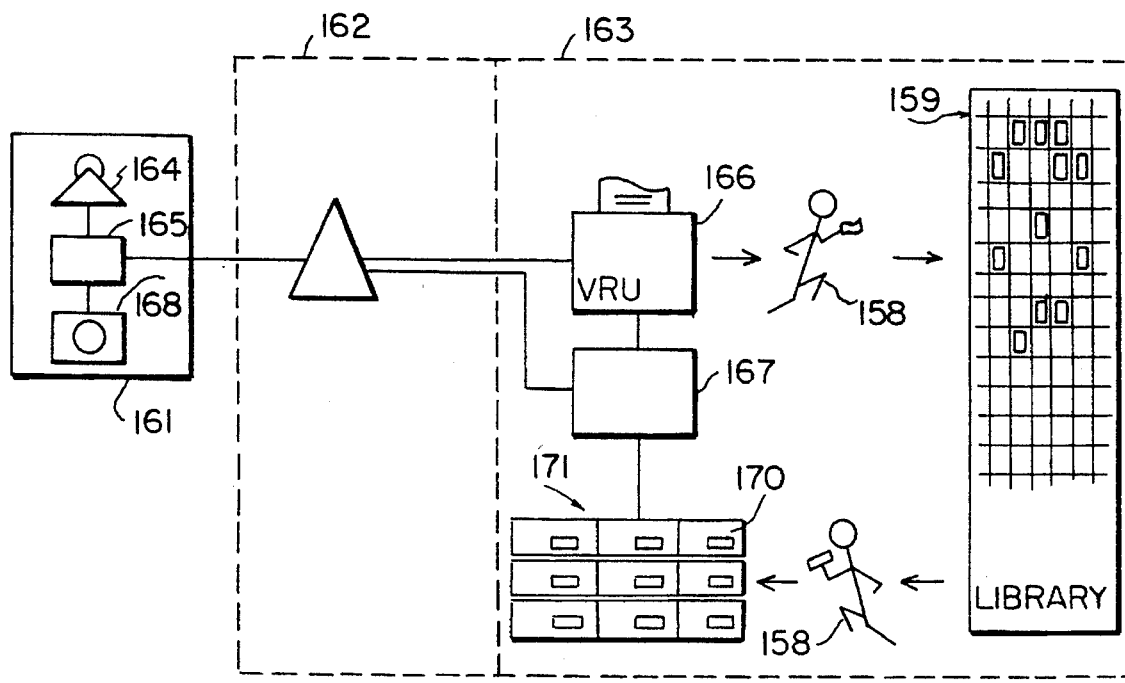
FIG. 16 shows a second related art system.

FIG. 14 illustrates the internal functioning of the ASU 82, including the ICSU 83. The ASU and ICSU have three primary tasks: (i) serving as an input means for loading new title data into the ISCP; (ii) maintaining a master subscriber database; and (iii) monitoring and processing subscriber usage of the ISCP for billing and other purposes. Referring to FIG. 14, the tasks performed by the ASU and the ICSU are title archival 100, subscriber oversight 101, and usage processing 102.

The ICSU 83 is used by the service provider to capture the data of which each title is composed and integrate that data into the ISCP library. This process is referred to herein as title archival 100. The particular manner and format for inputting title data into the ICSU 83 is not material to the invention. In order to render the ISCP as versatile as possible, the ICSU 83 is preferably capable of capturing data in a variety of ways. Thus, the data capture preferably accepts title data from many types of storage media, including film reel, CD-ROM, Laser Disc, PAL tape, VHS tape, and DAT.

Once transferred from the storage media to the ICSU 83, the title data (movies, video games, etc.) is compressed and placed in an archive-ready format by a title archive controller 103. The title archive controller 103 includes functions allowing the service provider to preview, verify and perform quality control of each title captured. Once the service provider is satisfied with the archive-ready title, it is stored in a title archive database 104.

In the embodiment illustrated in FIG. 14, the title archive controller 103 has the additional responsibility of library management. Alternatively, this management function can be segregated from the ICSU 83 and, for instance, integrated into the ASU 82 itself. Library management entails (i) transferring titles from the title archive database 104 to one of the operational databases 23, 25 in the RFU 8; (ii) shifting titles between the operational databases 23 and 25; and (iii) transferring titles out of the operational databases and into an inactive location. Inactive locations could entail anything from storing the title in the title archive database 104 to placing the title in backroom storage, or even irretrievably discarding the title. This ability to transfer titles between storage locations is desirable since many titles (e.g., first run movies) wax and wane in popularity. As such, the ability to transfer titles allows the ISCP to match title popularity with subscriber accessibility. Once titles are transferred to one of the databases 23 or 25, subscribers may access them.

As shown in FIG. 14, title data is transferred between the ICSU 83 and the RFU 8 via the bus 84. In addition to the title data, the ICSU 83 also transfers title information data, captured by the title archival function 100, to the title information database 21 described earlier.

As noted above, subscriber oversight 101 is the responsibility of the ASU 82. Subscriber oversight 101 entails processing information that governs subscriber access to titles. In other words, the ASU 82 is provided with a master subscriber database 105 that contains lists of subscribers as well as a service profile for each subscriber. A subscriber authorization controller 106 allows the database 105 to be updated with subscriber/profile data either through direct entry of the information or through electronic information transfer. The subscriber authorization controller 106 also regulates the transfer of subscriber/profile data from the ASU 82 to the authorization database 22 of the RFU 8, which constitutes the system's operational subscriber database. The operational database 22 is updated periodically with information from the master database 105 through the transmission of data over the bus 84.

The ASU 82 also performs the usage processing 102 needed for billing and related purposes. Event messages are received by an event monitor 107 and stored in an event database 108 in the ASU 82. An event processor 109 selects events and processes them in accordance with automated procedures retrieved from an appropriate database 110. If the ISCP is incorporated in a telecommunications system, then the database 110 is preferably an AMA (Automated Message Accounting) database analogous to those known in the art. The events processed by the processor 109 are translated into a variety of usage detail records, which include billing records, royalty payment records, and other financial and business-related records.

In summary, the various systems disclosed allow a wide assortment of titles (e.g., movies, educational-, entertainment-, consumer-, and business-related information, and any information that can be converted into a stream of data) to be transmitted to a wide audience with great flexibility and minimal contention between users for the titles offered.

The above description of the preferred embodiments has been given by way of example. From the disclosure given, those skilled in the art will not only understand the present invention and its attendant advantages, but will also find apparent various changes and modifications that can be made to the methods and structures disclosed. It is sought, therefore, to cover all such changes and modifications as fall within the spirit and scope of the invention, as defined by the appended claims, and equivalents thereof.

We claim:

1. A system for communicating data, the data together forming at least one title in an interactive services information database, from a central station configured to administrate the information database to a plurality of remote stations, said system comprising:

storage means in the information database for storing the data;

retrieving means operatively connected to said storage means for retrieving the data as data blocks, wherein each data block is a sequential segment of the data;

a communications link operatively connected to said storage means and said retrieving means for receiving the retrieved data blocks and transmitting the retrieved data blocks from the central station; and a plurality of communications paths connecting respective remote stations with said communications link, wherein said communications link comprises:

an array of trunk processors, each associated with at least one of said communications paths; and a switch matrix operatively connected to said storage means, said retrieving means, and said array of trunk processors, wherein said switch matrix establishes switch paths between said storage means and said array of trunk processors in accordance with commands from said retrieving means.

2. The system according to claim 1, wherein said storage means stores the data in a sequence corresponding to a playback sequence of the data.

3. A system for communicating data, the data together forming at least one title in an interactive services information database, from a central station configured to administrate the information database to a plurality of communication paths, said system comprising:

a data storage area in the information database comprising at least one storage device designed to store the data;

a master service unit having at least one operations algorithm;

a communications link, located at the central station, having a plurality of outgoing lines connected to the communications paths; and at least one communications bus connected to each of said data storage area, said master service unit and said communications link for enabling communication therebetween; wherein said operations algorithm is configured to:

locate the data in said data storage area;

retrieve the data in the form of data blocks, each data block being a sequential segment of the data, from said data storage area;

locate an available one of said outgoing lines in said communications link; and provide the data blocks to the available outgoing line.

4. The system according to claim 3, wherein said communications link comprises:

a switch matrix having multiple inputs from said data storage area and multiple outputs; and a subscriber service unit, having a plurality of inputs and a plurality of outputs, wherein each of the inputs of said subscriber service unit mate with at least one of the outputs of said data storage area, and each of the outputs of said subscriber service unit mate with at least one of the communication paths.

5. The system according to claim 3, wherein said operations algorithm is further configured to:

receive a title request from a remote station; and respond to the title request by retrieving the data as the data blocks.

6. The system according to claim 3, wherein the interactive services information comprises audio-visual information.

7. The system according to claim 3, wherein the interactive services information comprises audio information.

8. The system according to claim 3, wherein the interactive services information comprises video information.

9. The system according to claim 3, wherein said storage device stores the data in a sequence corresponding to a playback sequence of the data.

10. The system according to claim 6, wherein the audio-visual information comprises movies.

11. The system according to claim 6, wherein the audio-visual information comprises television programming.

12. The system according to claim 6, wherein the audio-visual information comprises videogame programming.

13. The system according to claim 7, wherein the audio information comprises music.

14. The system according to claim 8, wherein the video information comprises online text information.

* * * * *